United States Patent
Thirumalai

(10) Patent No.: US 11,244,476 B2
(45) Date of Patent: Feb. 8, 2022

(54) SYSTEMS AND METHODS FOR LOW-COMPLEXITY NEAR LOSSLESS FIXED-RATE HYBRID DATA COMPRESSION CODECS

(71) Applicant: Samsung Display Co., Ltd., Yongin-si (KR)

(72) Inventor: Vijayaraghavan Thirumalai, Fremont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 35 days.

(21) Appl. No.: 16/900,833

(22) Filed: Jun. 12, 2020

(65) Prior Publication Data

US 2021/0312666 A1  Oct. 7, 2021

Related U.S. Application Data

(60) Provisional application No. 63/005,880, filed on Apr. 6, 2020.

(51) Int. Cl.
G06K 9/46 (2006.01)
G06T 9/00 (2006.01)

(52) U.S. Cl.
CPC ..................... *G06T 9/00* (2013.01)

(58) Field of Classification Search
CPC ......... G06T 1/0021; G06T 15/10; G06T 7/55; G06T 3/40; G06T 19/003; G06T 5/002; G06T 5/003; G06T 5/50; G06T 7/0002; G06T 9/002; G06T 2207/20084; G06T 2207/20172; G06T 2207/20182; H04N 1/32336; H04N 13/0275; H04N 13/0278; H04N 13/0282; H04N 19/117; H04N 19/13; H04N 19/136; H04N 19/176; H04N 19/182; H04N 19/436; H04N 19/124;

(Continued)

(56) References Cited

U.S. PATENT DOCUMENTS 5,933,195 A * 8/1999 Florencio ............. H04N 19/186
                                                        375/240.15
7,415,158 B1   8/2008 O'Neill (Continued)

FOREIGN PATENT DOCUMENTS

WO    2013/006370 A1    1/2013

*Primary Examiner* — Duy M Dang
(74) *Attorney, Agent, or Firm* — Lewis Roca Rothgerber Christie LLP

(57) ABSTRACT

A method for encoding data includes: receiving a frame of data including subunits; initializing a remaining bit budget for the frame; setting a current codec to a lossless codec having a lossless codec bitrate; and sequentially encoding the subunits, including: encoding a first subunit using the lossless codec to compute a first encoded sub-unit; subtracting a length of the first encoded subunit from the remaining bit budget; determining whether the remaining bit budget exceeds a first lossy bits required to encode a plurality of remaining subunits using a first lossy codec having a first lossy codec bitrate lower than the lossless codec bitrate; in response to determining that the remaining bit budget is less than or equal to the first lossy bits required, setting the current codec to the first lossy codec; and encoding a second subunit using the first lossy codec to compute a second encoded sub-unit.

22 Claims, 12 Drawing Sheets

(58) Field of Classification Search
CPC .... H04N 19/423; H04N 19/44; G06F 16/583; G06K 9/00201; G06N 20/20; G06N 3/0454; G06N 3/063; G06N 3/08
See application file for complete search history.

(56) References Cited

U.S. PATENT DOCUMENTS

| | | |
|---|---|---|
| 10,212,421 B2 * | 2/2019 | Dessy ................... H04N 19/44 |
| 2004/0001544 A1 | 1/2004 | Mehrotra |
| 2006/0045368 A1 | 3/2006 | Mehrotra |
| 2009/0257485 A1 | 10/2009 | Youn |
| 2013/0010864 A1 | 1/2013 | Teng |
| 2013/0050254 A1 | 2/2013 | Tran et al. |
| 2013/0121573 A1 | 5/2013 | Shen et al. |
| 2016/0301950 A1 | 10/2016 | Jacobson et al. |
| 2017/0251214 A1 | 8/2017 | Chan et al. |

\* cited by examiner

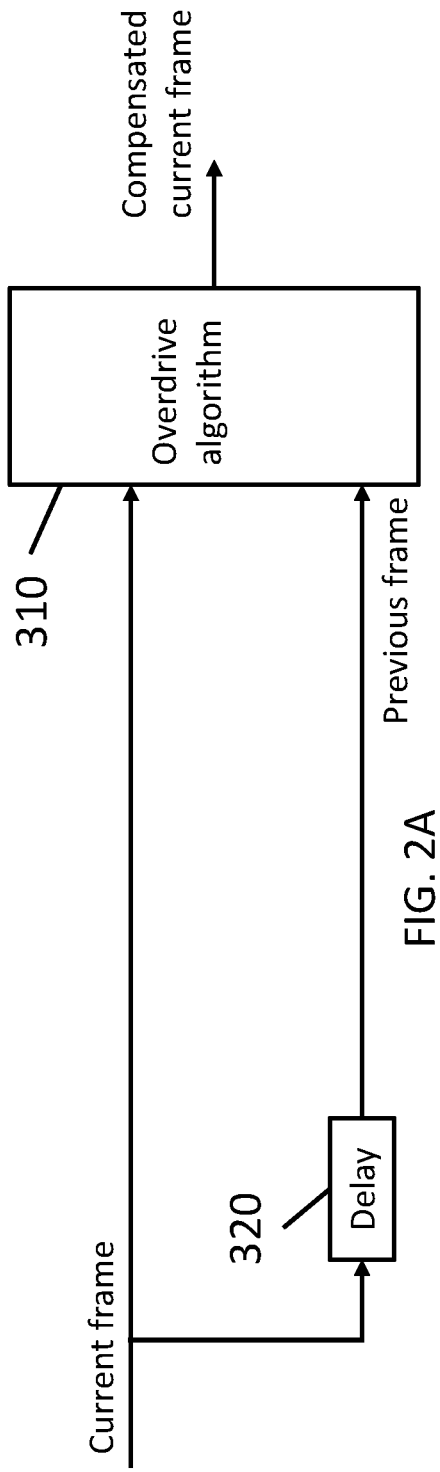
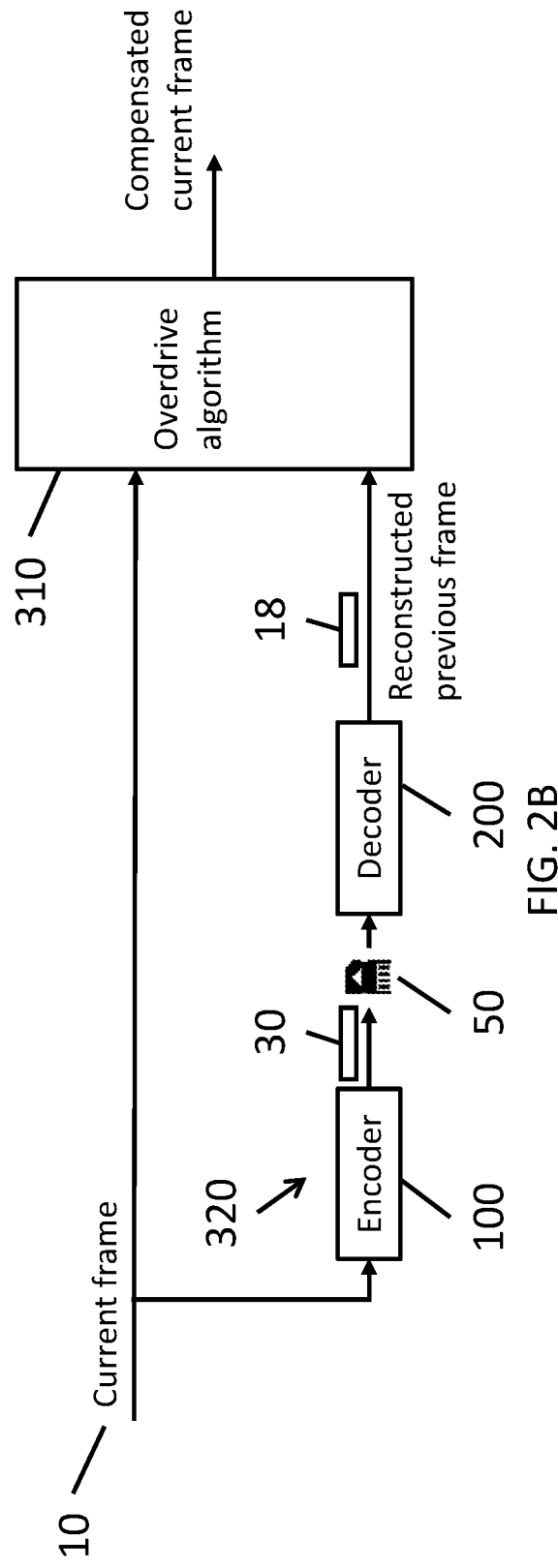

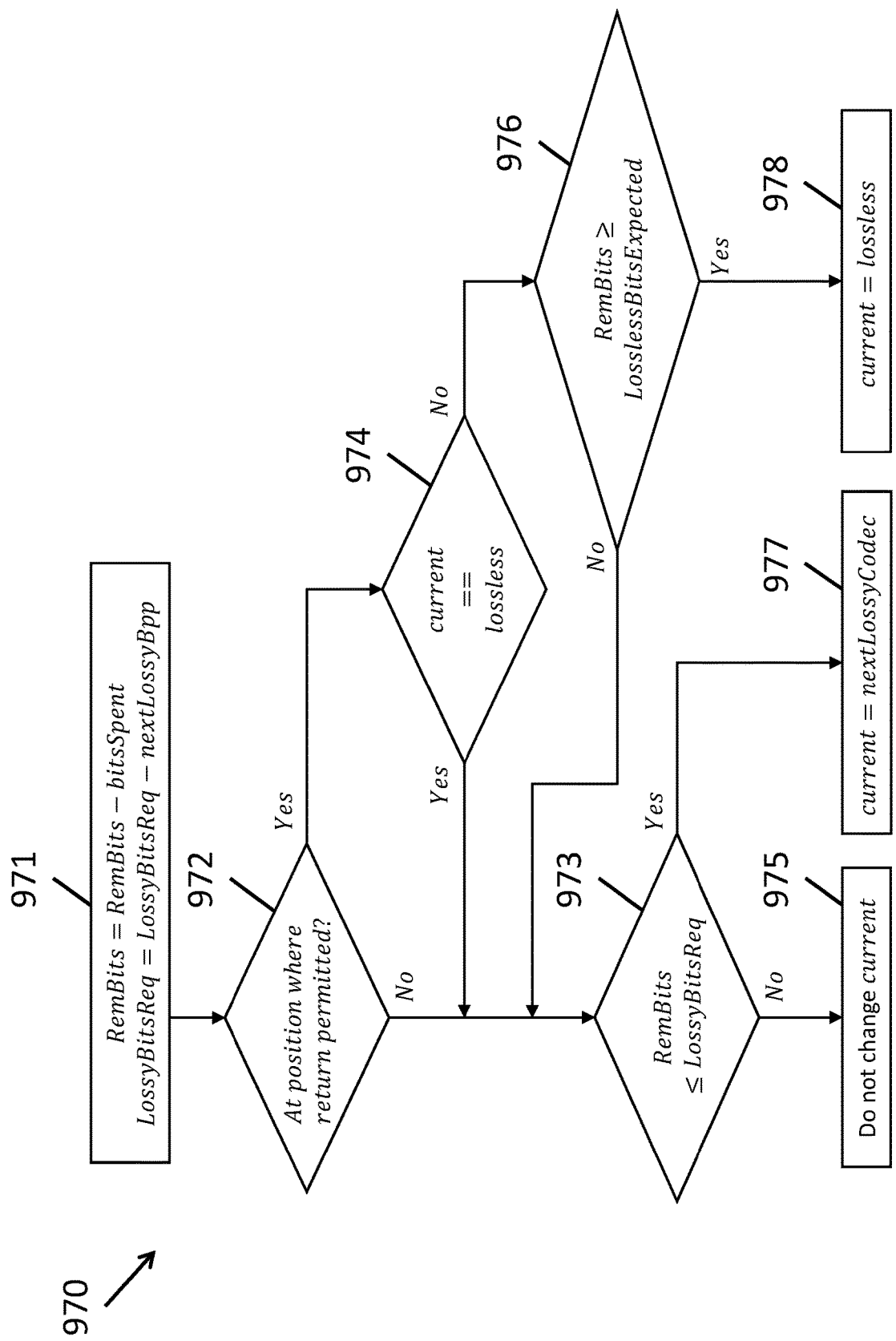

SYSTEMS AND METHODS FOR LOW-COMPLEXITY NEAR LOSSLESS FIXED-RATE HYBRID DATA COMPRESSION CODECS

CROSS-REFERENCE TO RELATED APPLICATION(S)

This application claims priority to and the benefit of U.S. Provisional Patent Application No. 63/005,880, filed in the United States Patent and Trademark Office on Apr. 6, 2020, the entire disclosure of which is incorporated by reference herein.

FIELD

One or more aspects of embodiments of the present disclosure relate to systems and methods for low-complexity near lossless fixed-rate hybrid data compression codecs.

BACKGROUND

Data compression is growing in importance for transferring and storing data in variety of fields. For example, as display resolutions increase, the amount of data stored and transmitted for each frame of image data increases. Compressing this data reduces the amount of data that must be transmitted to the display panel and can reduce the amount of data that is stored in memory to be displayed on display panel.

SUMMARY

Aspects of embodiments of the present disclosure are directed to systems and methods for low-complexity near lossless fixed-rate hybrid data compression codecs. Some aspects of embodiments of the present disclosure relate to a fixed-rate codec that: provides mathematically lossless performance on representative input data (e.g., data typically observed in an application in which the codec is designed to operate); meets a bitrate constraint on non-representative input data (e.g., input data having higher entropy than representative input data); and can operate without an additional internal memory buffer (e.g., without an additional line or compressed line buffer in the case where the input data is image data).

For example, some aspects of embodiments of the present disclosure relate to systems and methods for near lossless compression of image data for storage in a fixed size buffer and subsequent decompression of the stored compressed image data. Aspects of embodiments of the present disclosure also relate to the compression of image data for transmission over a data link and subsequent decompression of the compressed image data received over the data link.

According to one embodiment of the present disclosure, a method for encoding data includes: receiving a frame of data including a plurality of subunits; initializing a remaining bit budget to a bit budget for the frame of data; setting a current codec to a lossless codec having a lossless codec bitrate; and sequentially encoding the subunits of the frame of data, including: encoding a first subunit of the subunits using the current codec, set to the lossless codec, to compute a first encoded subunit; subtracting a length of the first encoded subunit from the remaining bit budget; determining whether the remaining bit budget exceeds a first lossy bits required to encode a plurality of remaining subunits of the frame of data using a first lossy codec having a first lossy codec bitrate lower than the lossless codec bitrate; in response to determining that the remaining bit budget is less than or equal to the first lossy bits required, setting the current codec to the first lossy codec; and encoding a second subunit of the subunits using the current codec, set to the first lossy codec, to compute a second encoded sub-unit.

The bit budget may include W-lossyBpp-1 extra margin bits, where W is the length of a longest binary codeword of a symbol in the lossless codec, and where lossyBpp is the first lossy codec bitrate.

The frame of data may be a frame of image data including a plurality of pixels.

The lossless codec may be a differential pulse coded modulation (DPCM) codec without quantization, and the first lossy codec may be a DPCM codec with quantization.

The bit budget may be set based on a size of a buffer in a display panel for storing the frame of image data for an overdrive algorithm.

Each of the subunits may be a pixel of the frame of image data.

Each of the subunits may be a line of pixels of the frame of image data.

Each of the subunits may be a block of pixels of the frame of image data.

The sequentially encoding the subunits of the frame of data may further include, in a state where the current codec is set to the first lossy codec: determining whether the remaining bit budget exceeds a second lossy bits required to encode the remaining subunits of the frame of data using a second lossy codec having a second lossy codec bitrate lower than the first lossy codec bitrate; in response to determining that the remaining bit budget is less than or equal to the second lossy bits required setting the current codec to the second lossy codec; and encoding a third subunit of the sub-units using the current codec, set to the second lossy codec, to compute a third encoded sub-unit.

The bit budget may further include: W-lossyBpp$_1$-1 extra margin bits, where W is the length of a longest binary codeword of a symbol in the lossless codec, and where lossyBpp$_1$ is the first lossy codec bitrate, and W$_1$-lossyBpp$_2$-1 extra margin bits, where W$_1$ is the length of a longest binary codeword of a symbol in the first lossy codec, and where lossyBpp$_2$ is the second lossy codec bitrate.

The sequentially encoding the subunits of the frame of data may further include, in the state where the current codec is set to a codec other than the lossless codec: determining whether the remaining bit budget exceeds an expected number of bits to encode the remaining subunits of the frame of data using the lossless codec; in response to determining that the remaining bit budget exceeds the expected number of bits to encode the remaining subunits of the frame of data using the lossless codec, setting the current codec to the lossless codec; and encoding a fourth subunit of the subunits using the current codec, set to the lossless codec, to compute a fourth encoded sub-unit.

According to one embodiment of the present disclosure, an encoder includes: one or more processing circuits configured to: receive a frame of data comprising a plurality of subunits; initialize a remaining bit budget to a bit budget for the frame of data; set a current codec to a lossless codec having a lossless codec bitrate; encode a first subunit of the plurality of subunits using the current codec, set to the lossless codec, to compute a first encoded subunit; subtract a length of the first encoded subunit from the remaining bit budget; determine whether the remaining bit budget exceeds a first lossy bits required to encode a plurality of remaining subunits of the frame of data using a first lossy codec having a first lossy codec bitrate lower than the lossless codec bitrate; in response to a determination that the remaining bit budget is less than or equal to first lossy bits required set, the current codec to the first lossy codec; and encode a second subunit of the subunits using the current codec, set to the first lossy codec, to compute a second encoded sub-unit.

The bit budget may include W-lossyBpp-1 extra margin bits, where W is the length of a longest binary codeword of a symbol in the lossless codec, and where lossyBpp is the first lossy codec bitrate.

The frame of data may be a frame of image data including a plurality of pixels.

The lossless codec may be a differential pulse coded modulation (DPCM) codec without quantization, and the first lossy codec may be a DPCM codec with quantization.

The bit budget may be set based on a size of a buffer in a display panel for storing the frame of image data for an overdrive algorithm.

Each of the subunits may be a pixel of the frame of image data.

Each of the subunits may be a line of pixels of the frame of image data.

Each of the subunits may be a block of pixels of the frame of image data.

The one or more processing circuits may be further configured to, in a state where the current codec is set to the first lossy codec: determine whether the remaining bit budget exceeds a second lossy bits required to encode the remaining subunits of the frame of data using a second lossy codec having a second lossy codec bitrate lower than the first lossy codec bitrate; in response to a determination that the remaining bit budget is less than or equal to the second lossy bits required, set the current codec to the second lossy codec; and encode a third subunit of the subunits using the current codec, set to the second lossy codec, to compute a third encoded sub-unit.

The bit budget may further include: W-lossyBpp$_1$-1 extra margin bits, where W is the length of a longest binary codeword of a symbol in the lossless codec, and where lossyBpp$_1$ is the first lossy codec bitrate, and W$_1$-lossyBpp$_2$-1 extra margin bits, where W$_1$ is the length of a longest binary codeword of a symbol in the first lossy codec, and where lossyBpp$_2$ is the second lossy codec bitrate.

The one or more processing circuits may be further configured to, in the state where the current codec is set to a codec other than the lossless codec: determine whether the remaining bit budget exceeds an expected number of bits to encode the remaining subunits of the frame of data using the lossless codec; in response to a determination that the remaining bit budget exceeds the expected number of bits to encode the remaining subunits of the frame of data using the lossless codec, set the current codec to the lossless codec; and encode a fourth subunit of the subunits using the current codec, set to the lossless codec, to compute a fourth encoded sub-unit.

These and other features, aspects and advantages of the embodiments of the present disclosure will be more fully understood when considered with respect to the following detailed description, appended claims, and accompanying drawings. However, the scope of the invention is defined by the claims and equivalents thereof.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a schematic block diagram illustrating a display panel system implementing overdrive.

FIG. 2B is a schematic block diagram illustrating an application of an encoder and a decoder according to embodiments of the present disclosure in a display panel system for implementing overdrive.

FIG. 9B is a flowchart depicting a method for updating a state of a rate controller of a hybrid data compression codec using multiple lossy codecs with return to lossless according to one embodiment of the present disclosure.

DETAILED DESCRIPTION

Figure 1:
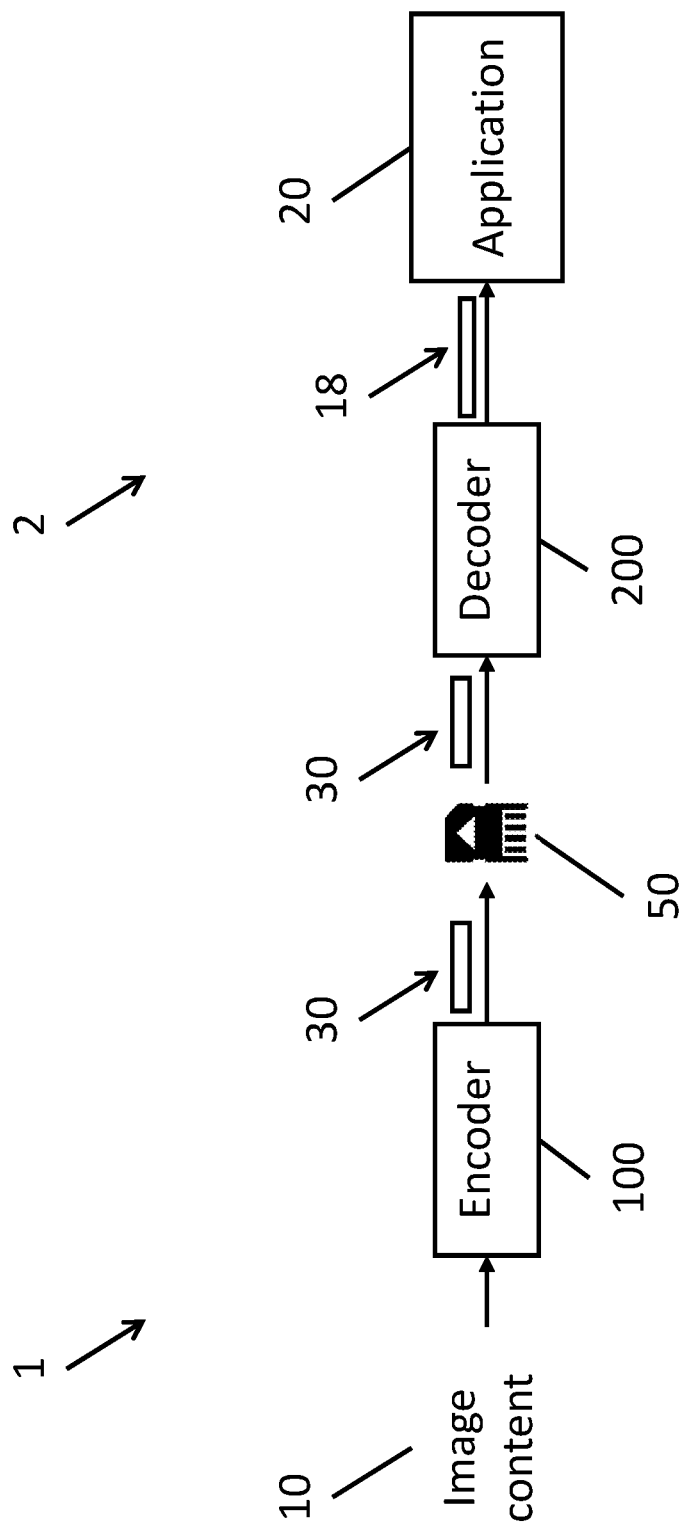
FIG. 1 is a schematic block diagram of encoder and decoder hardware according to one embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Data compression generally relates to encoding information using fewer bits than its original representation. Certain applications demand mathematically lossless compression-compression in which no information is lost and the original representation can be decoded from the encoded representation. In addition, some applications may place limits on the size of the encoded representation (e.g., compressed data). For example, a fixed budget in terms of storage space or bitrate may be allotted for each unit or frame of data. To illustrate, an application may store compressed data in a fixed size buffer or use the compressed data in a constant bitrate (CBR) codec. Accordingly, some aspects of embodiments of the present disclosure relate to a fixed-rate mathematically lossless (or nearly lossless) compression system to meet these requirements.

For the sake of convenience, various embodiments of the present disclosure will be described herein in the context of nearly lossless compression of frames of image data. However, embodiments of the present disclosure are not limited thereto, and may be applied to the compression of other types of digital data in contexts that are tolerant of some degree of lossy compression (e.g., text, audio, video, and image data).

FIG. 1 is a schematic block diagram of encoder and decoder hardware according to one embodiment of the present disclosure. As shown in FIG. 1, image content 10 is supplied an encoder 100, which encodes the supplied image content 10 to compute data 30 (or an encoded or compressed bitstream 30). The image content 10 may correspond to an image frame (e.g., a bitmap representation of a single image) or a portion of a single image or frame (e.g., a single channel of a frame, a slice or partition of a frame, etc. A slice is a spatially distinct region of an image frame and may be encoded separately from other slices in the same frame.). The encoded data 30 may be transmitted to a decoder 200 over a physical medium 50. The encoder 100 and the decoder 200 may be implemented using one or more processing circuits (e.g., a central processing unit (CPU), a digital signal processor (DSP), a field programmable gate array (FPGA), an application specific integrated circuit (ASIC), and/or a graphics processing unit (GPU)). For example, the encoder 100 and the decoder 200 may be implemented using the same physical processing circuits (e.g., a processing circuit configured to implement both the encoder 100 and the decoder 200), or using different processing circuits (e.g., a first processing circuit configured to implement the encoder and a second processing circuit configured to implement the decoder).

For the sake of discussion herein, in some embodiments of the present disclosure, transmitting the encoded data 30 to a decoder 200 over a physical medium 50 includes storing the encoded data 30 on a physical storage medium 50 such as buffer memory (e.g., dynamic random access memory (DRAM), static random access memory (SRAM), flash memory such as NAND flash memory, optical media such as compact discs, digital versatile discs, Blue-ray discs, magnetic media such as hard disk drives, or the like). In some embodiments, the encoder 100, the decoder 200, and the storage medium 50 are all contained within a same physical device, such as within a display driver integrated circuit (DDIC) of a display device.

In some embodiments of the present disclosure, the encoded (or compressed) bitstream 30 is transferred over a wired or wireless connection. In some embodiments discussed herein, a transfer over a wired connection is described, but the techniques described herein may also be applicable in implementations that involve transfer over a wireless connection. In some embodiments, the encoded (or compressed) bitstream 30 is transferred over a physical medium 50 (e.g., over a wire such as a data bus or a cable or other connector or over a wireless connection) to a display driver integrated circuit (DDIC) of a display device (e.g., an external monitor, a television, or an integrated display panel of a smartphone, tablet, or laptop computer). In some embodiments, the encoded data 30 is transferred over a computer network such as a local area network (LAN) or a wide area network (WAN) such as the Internet or other telecommunications network such as a cellular wireless data network and combinations of different types of networks.

The decoder 200 is configured to decode the encoded (or compressed) bitstream 30 received from the physical medium 50 into a decompressed representation 18. In the case of a lossless encoding, the decompressed representation 18 is the same (or substantially the same) as the original representation of the image content 10. In the case of lossy encoding, the decompressed representation 18 may be substantially similar (e.g., visually similar) to the original representation of the image content 10 such that the resulting data appears visually lossless. As used herein, the decompressed representation 18 may be considered substantially similar to the original representation of the image content 10 in response to a peak-signal-to-nose ratio (PSNR) metric associated with the representations, a structural similarity (SSIM) metric associated with the representations, another metric associated with the representations, or a combination thereof satisfying one or more thresholds. The decoder 200 may then supply the decoded representation 18 to other hardware or software modules for further use by a hardware or software application 20. For example, the decoded representation 18 may be image data that is to be displayed on a display panel, such as by supplying driving waveforms to the display panel to control the luminance of individual pixels of the display panel in accordance with the decoded representation 18 of the image content 10.

One application for lossless (or nearly lossless) fixed rate compression of image data in accordance with embodiments of the present disclosure is the implementation of overdrive in a display panel system. Generally, a liquid-crystal display (LCD) panel may exhibit motion blur or other visual artifacts due to slow response times of liquid crystals within the LCD panel when transitioning between different states. This may be particularly evident when there is a large change in gray level from one frame to the next and when operating the LCD panel at high refresh rates (e.g., at refresh rates above 60 Hz such as 144 Hz). Overdrive is one technique to shorten the transition time between liquid-crystal states by driving the crystals at higher voltages. However, the higher driving voltage can cause overshoot effects that persist into the period for displaying the following image frame (e.g., at a refresh rate of 60 Hz, each image frame is displayed for approximately 16.67 milliseconds, but the effects of overdrive may persist for longer than 16.67 milliseconds). Accordingly, information from the previously image frame is used to modify the driving signals for the display of the current frame, thereby reducing or removing visual artifacts due to overdrive.

FIG. 2A is a schematic block diagram illustrating a display panel system implementing overdrive. As shown in FIG. 2A, a current image frame (e.g., n-th image frame) and a previous frame (e.g., an (n−1)-th image frame) are supplied to an overdrive algorithm module 310, which is configured to generate a compensated current frame, which compensates for the effect of using overdrive when displaying the previous ((n−1)-th) frame. The current frame or n-th frame is also supplied to a delay module 320, which delays the signal associated with the current frame such that it is supplied to the overdrive algorithm module 310 together with the next frame (or (n+1)-th frame, e.g., the frame after the current frame or n-th frame). For example, in the case of an LCD panel with a refresh rate of 60 Hz, the delay 320 may delay the output of the data for approximately 16.67 milliseconds. In some circumstances, the delay 320 may include a memory for storing the current frame during the delay period.

In some circumstances, storing the current frame in the memory of the delay 320 can raise various design tradeoffs. For example, in order to perform overdrive compensation perfectly accurately, the data supplied by the delay 320 should be identical to the data that was supplied to the delay. One way to do so would be to save the current frame data, in its entirety, to the memory. However, doing so may result in high power consumption and/or high input/output bandwidth requirements in order to write and read all of the image frame data within one frame period (e.g., about 16.67 milliseconds). In addition, a large amount of memory may significantly increase the hardware costs associated with a display device.

FIG. 2B is a schematic block diagram illustrating an application of an encoder and a decoder according to embodiments of the present disclosure in a display panel system for implementing overdrive. In more detail, according to some embodiments, an encoder 100 and a decoder 200 may be used with a storage medium 50 to implement a delay 320. For example, the encoder 100 encodes the current frame (or n-th frame), and stores or buffers the compressed n-th frame in the storage medium 50 for approximately the period of one frame. The decoder 200 then reconstructs the n-th frame from the stored data and supplies the reconstructed n-th frame to the overdrive algorithm module 310, which combines the reconstructed n-th frame with the (n+1)-th frame to compute a compensated (n+1)-th frame.

Using the encoder 100 to compress the current frame can reduce the size of the data (e.g., number of bits) to be stored in the storage medium 50 during the delay period (e.g., for 16.67 milliseconds in the case of a refresh rate of 60 Hz). This data compression can therefore accelerate processing and reduce power consumption by reducing the amount of data to be written and read, and also reduces the cost of the device by reducing the amount of physical memory that is allocated within the delay 320 for storing the image frame. In addition, when the encoder 100 and the decoder 200 implement fast and simple codecs, the encoding and decoding of the image frames can be performed at a lower cost (e.g., in power and hardware) than storing the uncompressed image frame. Because the size of the storage medium 50 is constrained at the time of designing the hardware for the delay module 320, the codec applied to compress the image frames is a fixed-rate codec—e.g., the encoded data 30 is constrained to a bit budget set by the size of the storage medium 50, and the codec cannot generate a frame of encoded data 30 that is larger than the bit budget. This fixes a compression ratio, which may be determined by the source bit-per-pixel (bpp) and the fixed size of the storage medium 50. Furthermore, as noted above, good reconstruction quality and/or mathematically lossless reconstruction based on the previous frame results in more accurate overdrive compensation.

Generally, mathematically lossless performance may not be achievable at all times when a bitrate constraint is imposed. In particular, for some portion of possible input frames of data, an encoder may encode an input frame of data into an encoded representation that is larger than the bitrate constraint (e.g., an encoded representation that is larger than the bit budget for the codec).

Accordingly, some aspects of embodiments of the present disclosure are directed to a fixed-rate codec that provides mathematically lossless performance on representative (e.g., typical) inputs, while also meeting the bitrate constraint when provided with non-representative (e.g., atypical) inputs, and that can also do so with reduced or minimized memory usage (e.g., memory buffers in the encoder).

Accordingly, some aspects of embodiments of the present disclosure relate to applying a lossless (or near-lossless) codec to encode frames of input data and falling back to a lossy codec when the bit budget associated with the fixed-rate codec will be exceeded.

One approach that uses both a lossless codec and a lossy codec is to first apply the lossless codec on the entire frame of data. If the losslessly encoded data fit within the bit budget, then that losslessly encoded data would be output by the codec. However, in circumstances where the frame of input data caused the lossless codec generates encoded data that exceeds the bit budget, then the lossy codec is applied to the frame of input data to generate lossily encoded data. In embodiments where the different codecs are applied sequentially, the frame of input data must be buffered (e.g., so that the lossy codec can read the buffered copy of the input data in circumstances where the output of the lossless codec exceeded the bit budget), and in embodiments where the different codecs are applied in parallel, a compressed frame buffer may be needed to store the lossily encoded output of the lossy codec, to be used instead of the output of the lossless codec in circumstances where the lossless codec exceeds the bit budget.

One approach to reduce the amount of buffering (e.g., the size of buffers in the encoder) is to apply a subunit-based approach in which subunits of a frame of data are encoded one at a time. For example, in the case of a frame of image data, the sub-unit may be a line (or row) of the image data. Accordingly, the serial or parallel approaches to applying lossless and lossy codecs may be applied to each subunit of the frame of data instead of the whole frame of data, where each subunit may be allocated an equal portion of the overall bit budget for the frame of data. This allows the size of the input buffer (or the compressed buffer) to be reduced to the size of the subunit (or encoded sub-unit). However, this still uses some buffer memory in the encoder and may also result in reduced performance, because not all lines are equally complex (e.g., different subunits or lines may have different levels of entropy). Allocating equal portions of the overall bit budget to each subunit may reduce overall performance, because excess budget available from simple subunits cannot be reallocated to encode complex sub-units. Therefore, this approach may have lossy performance compared to a codec that selected between lossless and lossy encodings based on the entire frame rather than on a sub-unit by subunit basis.

Figure 3:
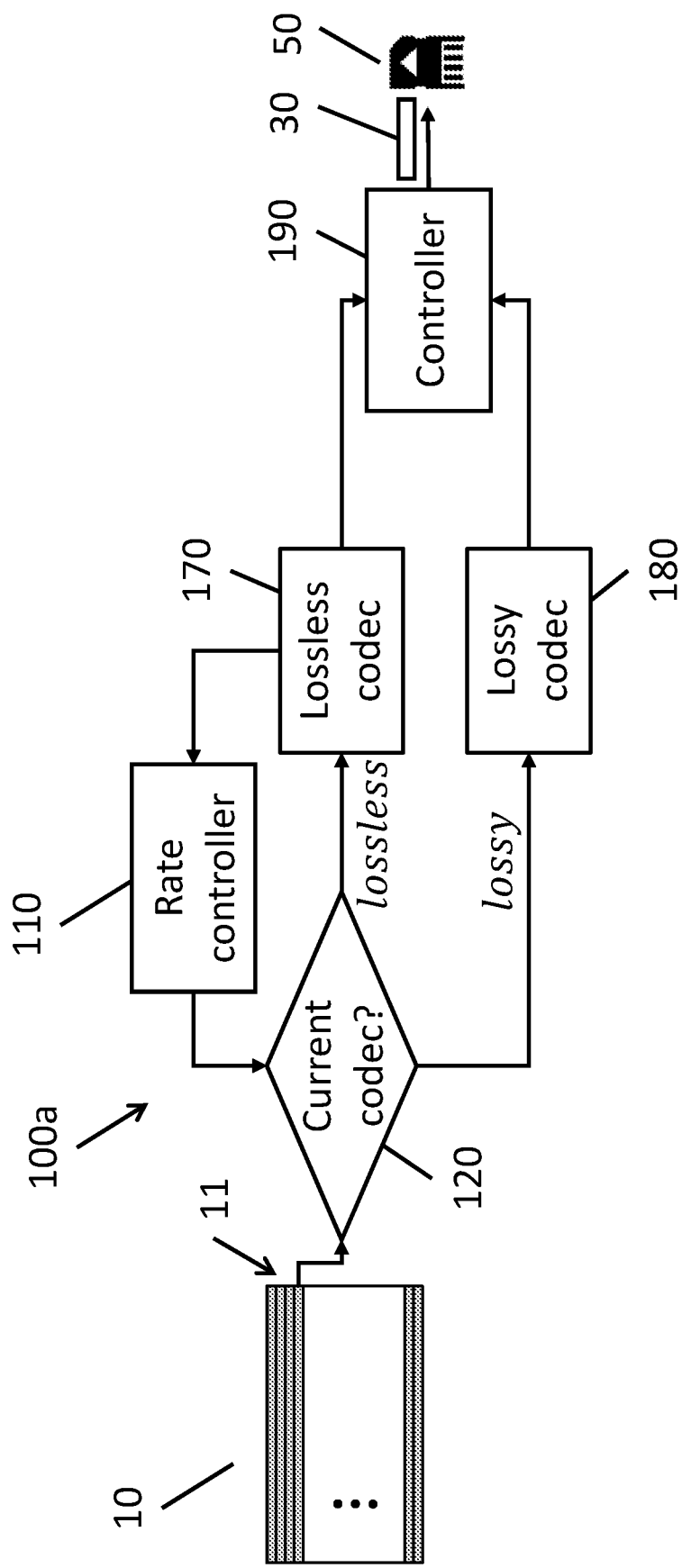
FIG. 3 is a schematic block diagram illustrating an encoder implementing a hybrid data compression codec according to one embodiment of the present disclosure.

Accordingly, some aspects of embodiments of the present disclosure relate to a hybrid data compression codec in which both lossless and lossy codecs are used to compress data to meet a fixed-rate bit budget. FIG. 3 is a schematic block diagram illustrating an encoder 100*a* implementing a hybrid data compression codec according to one embodiment of the present disclosure. The encoder 100*a* shown in the embodiment of FIG. 3 is one embodiment of the encoder 100 (e.g., as shown in FIG. 1) and includes a rate controller 110, a codec selector 120 that directs input data 10 to a currently selected codec, a lossless codec 170 and a lossy codec 180 configured to, respectively, losslessly or lossily encode the input data 10, and a controller 190 configured to receive the encoded data from a codec (e.g., the lossless codec 170 or the lossy codec 180) and transmit the encoded data for use by an application. In the illustrated example, the controller 190 stores the encoded data 30 in a storage medium 50 accessible by the application.

Embodiments of the present disclosure are agnostic to the particular lossless codec 170 and lossy codec 180 used. According to some embodiments of the present disclosure, the lossless codec 170 guarantees mathematically lossless performance-JPEG lossless or in general predictive coding schemes (such as differential pulse coded modulation or DPCM) are non-limiting examples of codecs that can provide such mathematically lossless performance. To achieve lossless performance, in some embodiments of the present disclosure, the lossless codec omits a quantization operation and/or omits a transform operation such as discrete cosine transform (DCT) or wavelet transform. According to some embodiments of the present disclosure, the lossy codec 180 guarantees fixed-rate behavior—predictive coding schemes, with or without transform, and with or without quantization, are non-limiting examples of codecs that can provide fixed-rate behavior. In various embodiments of the present disclosure directed to encoding image data, the lossy codec 180 can be pixel-based or can be block-based (e.g., encoding blocks of multiple neighboring pixels or samples).

According to some aspects of embodiments of the present disclosure, a hybrid data compression codec compresses input data such that an encoded representation of the input data fits within a target bit budget (TargetBitBudget). For example, in the case of compressing image data, the bit budget may be the total number of pixels in the input image ($N_{pixels}$) multiplied by the target bits-per-pixel (targetBpp), or $N_{pixels} \times$ targetBpp. According to some embodiments of the present disclosure, the targetBpp and the lossless codec 170 are designed such that representative data (e.g., representative images) can be encoded by the lossless codec within the bit budget (targetBpp may be based on a source bit depth of the image content 10 and a desired compression ratio. In an illustrative example, RGB content has a bit depth for each color component of 3 (e.g., source bit depth=9) and a desired compression ratio is 1.5. Accordingly, the targetBpp may be 9/1.5=6.)

As a concrete example, in the case of implementing overdrive for an LCD panel for a desktop or laptop computer, smartphone, or tablet, representative images may correspond to screenshots of typical user interactions such as productivity applications, web browsing, video playback, and games, whereas non-representative images may correspond to atypical images having high entropy, such as random noise (e.g., video "snow").

The lossy codec has a bitrate (lossyBpp) lower than the target bitrate (lossyBpp<targetBpp and/or lossyBpp<losslessBpp) to serve as a fallback for circumstances where the lossless codec may not be able to encode the entire input frame within the bit budget. The bitrate of the lossy codec may be referred to herein as the lossy codec bitrate. Accordingly, some aspects embodiments of the present disclosure relate to encoding some portions of the input frame of data using a lossless codec and encoding other portions of the input frame of data using a lossy codec in order to encode the entire frame within the bit budget.

Figure 4:
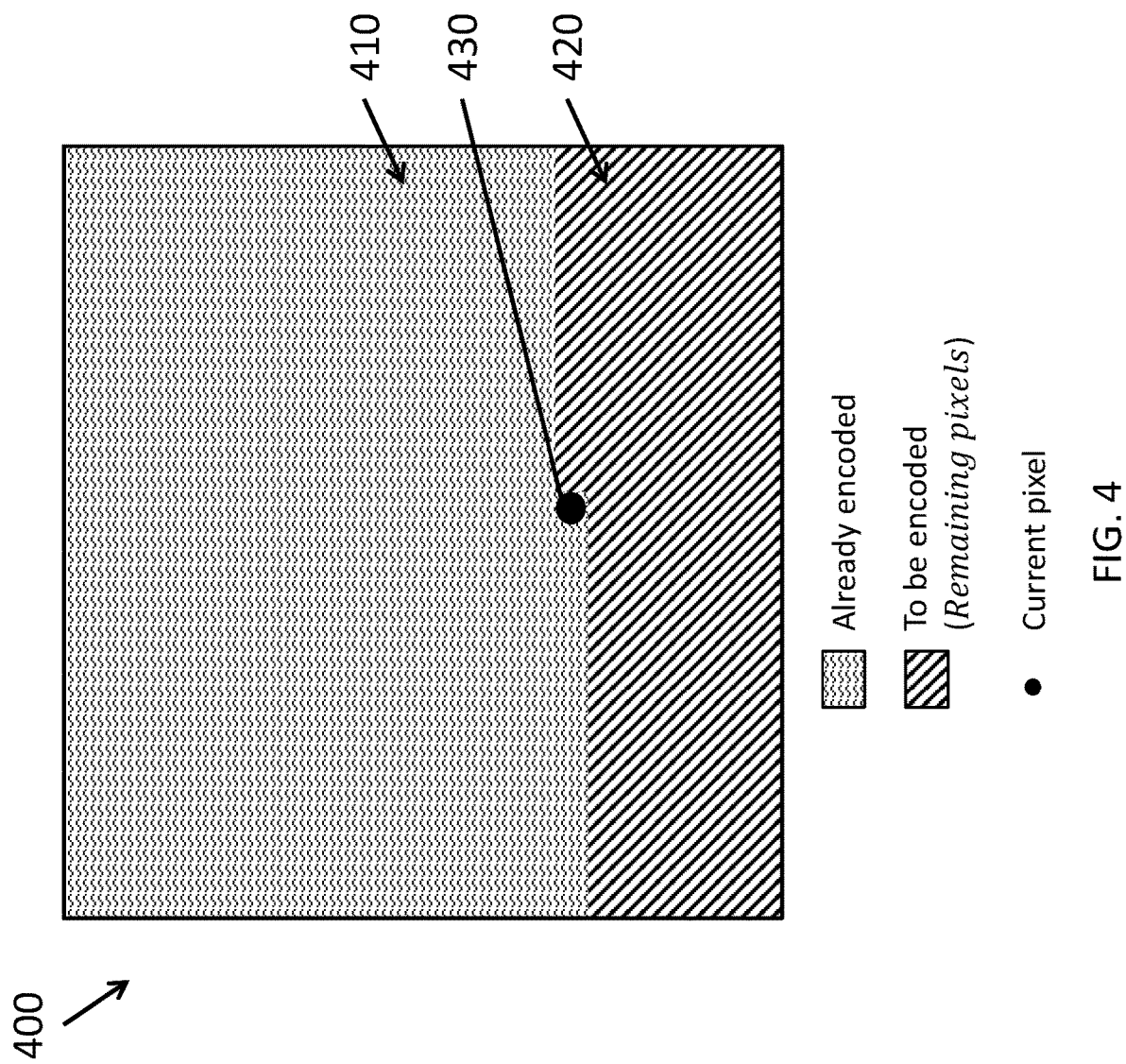
FIG. 4 is a schematic depiction of a process for determining whether to switch from a higher bitrate codec to a lower bitrate codec in accordance with one aspect of embodiments of the present disclosure.

As one example, FIG. 4 is a schematic depiction of a process for determining whether to switch from a higher bitrate codec to a lower bitrate codec in accordance with one aspect of embodiments of the present disclosure. As shown in FIG. 4, while encoding a frame of image data 400 from top to bottom and left to right, a first portion 410 the frame 400 is already encoded (or previously encoded) by the encoder 100a, and a second portion 420 of the frame is yet to be encoded (RemainingPixels). A current pixel 430 (or current value or symbol) is the pixel being encoded by the encoder 100a. Based on the encoding of the current pixel 430, rate controller 110 updates its state and determines whether the current pixel 430 and the second portion 420 should be encoded using the lossless codec 170 or the lossless codec 180.

An input frame of data 10 may be divided into a plurality of sub-units 11. For example, FIG. 3 depicts the compression of a frame of image data 10. The input frame of image data 10 includes a plurality of pixels arranged in a grid or two-dimensional array, where the grid of pixels may be divided into sub-units 11 such as rows (or lines), blocks (e.g., groups of adjacent pixels or groups of adjacent values) or individual pixels (e.g., individual values). In some embodiments, the frame 10 of image data may correspond to, for example, a single channel of image data, such as, in the case of RGB data, a red channel, a green channel, or a blue channel, and each value may correspond to a gray level of the channel (as another example, the image data may be YUV data and the channels correspond to a Y channel, a U channel, and a V channel).

Figure 5A:
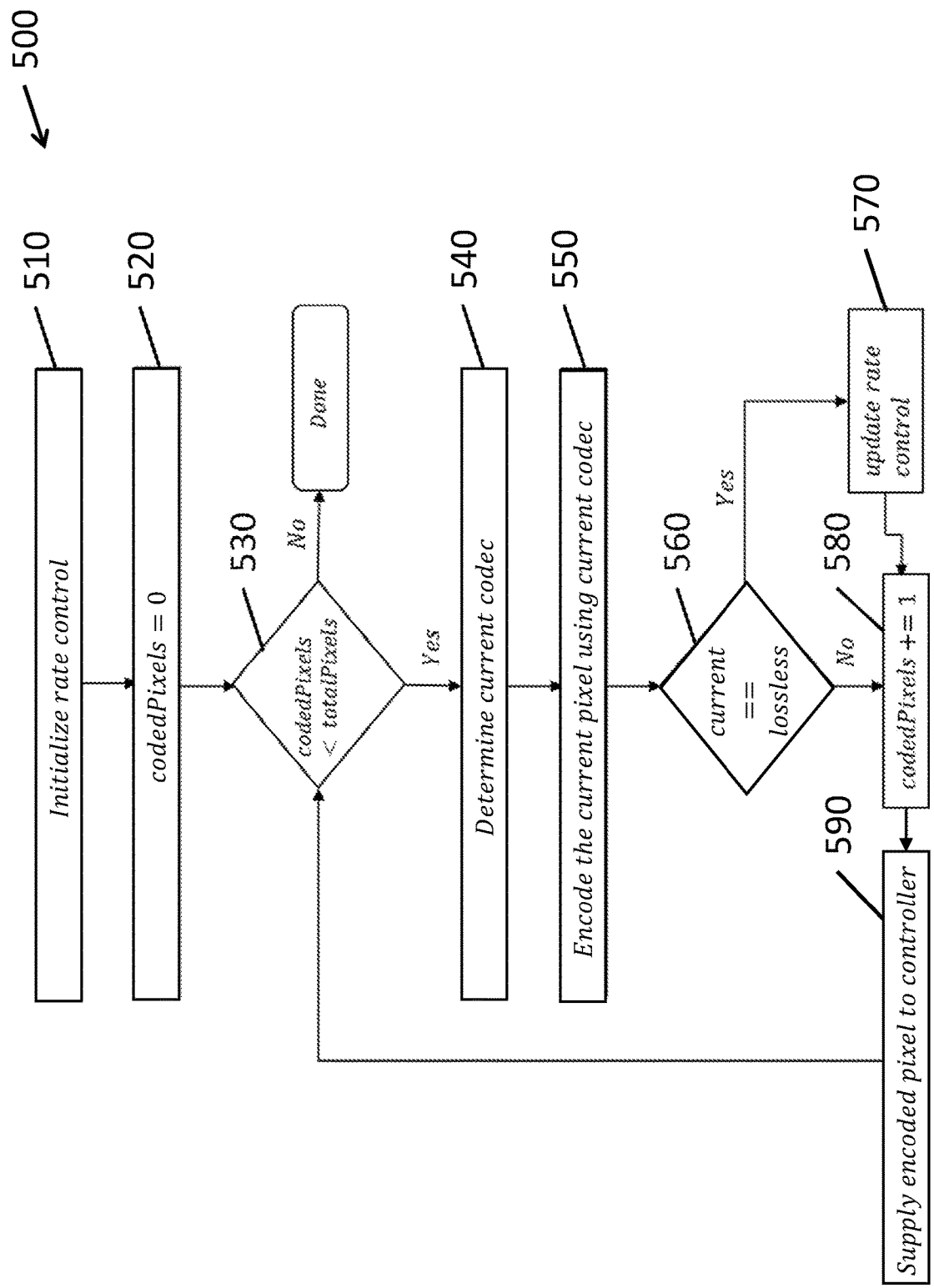
FIG. 5A is a flowchart of a method for encoding image data using hybrid data compression according to one embodiment of the present disclosure.

FIG. 5A is a flowchart of a method 500 for encoding image data using hybrid data compression according to one embodiment of the present disclosure that may be performed by the encoder 100a of FIG. 3. As noted above, while aspects of embodiments of the present disclosure are described herein in the context of encoding and decoding image frames, and while one application of embodiments of the present disclosure is described above in the context of overdrive compensation in LCD panels, embodiments of the present disclosure are not limited thereto and may also be applied to other contexts in which a fixed-rate codec may be desired (e.g., where constant bitrate codecs are used to meet quality of service constraints based on available bandwidth). Nevertheless, for the sake of convenience and clarity, FIGS. 3, 4, 5A, and 5B will be described below in the context of encoding image data.

Before starting to compress a new frame of data 10, in operation 510, the rate controller 110 of the encoder 100a initializes a current codec setting to identify the lossless codec 170, initializes a remaining bit budget (RemBits) value to a target bit budget for the input frame of data 10, and initializes a lossy bits required (LossyBitsReq) value to the product of the total number of pixels (or samples) in the input frame of data 10 and the lossy bitrate (lossyBpp) of the lossy codec 180. In operation 520, the rate controller 110 also initializes a number of coded pixels (codedPixels) (e.g., number of coded symbols of the frame of data 10) to zero. As the pixel samples (e.g., symbols or values) are received by the encoder 100a (e.g., for image data, by row from top to bottom and from left to right within each row) the encoder 100a determines, in operation 530, if it has finished encoding the current frame of data 10. For example, the encoder 100a may compare the number of coded pixels to the total number of pixels (totalPixels) (or the number of coded symbols to the total number of symbols) in the input frame of data 10. If the number coded pixels is less than the total pixels, then there are more pixels to encode, otherwise the encoding process for the frame is done (and the encoder 100a proceeds to operation 510 to encode the next frame of data). As noted above, while FIG. 5A describes an embodiment in which the sub-units are individual pixels, embodiments of the present disclosure are not limited thereto, and the rate controller may, for example, track the progress of the encoding process based on sub-units, e.g., codedSubunits and totalSubunits.

In operation 540, the encoder 100a determines which codec is set as the current codec (e.g., the lossless codec 170 or the lossy codec 180). In operation 550, the encoder applies a lossless codec 170 or a lossy codec 180 to encode the current sub-unit (e.g., the current pixel) based on the codec identified by the current codec state (current). In operation 560, the encoder 100a determines whether the current codec is the lossless codec 170 (current=lossless). If so, then in operation 570, the encoder 100a updates the rate controller 110 to determine whether to change the current codec, as described in more detail below with respect to FIG. 5B. If not, then the rate controller 110 proceeds to operation 580.

In operation 580, the number of coded pixels (or subunits) is incremented to identify that one more pixel (or subunit) has been encoded (codedPixels+=1), and in operation 590, the encoded data 30, as encoded by either the lossless codec or the lossy codec (as selected in accordance with the current codec, as set by the rate controller 110), is supplied to a controller 190. The controller 190 may store the data in a storage medium 50 or transmit the data (e.g., supply the data to a display controller or a network controller). The encoder 100a then returns to operation 530 to determine whether there are more pixels to encode and to continue encoding or to finish the encoding of the current frame accordingly.

In some embodiments, the lossless codec 170 is used as long as there are more than enough remaining bits (RemBits) in the bit budget (or enough remaining bit budget) to perform a lossy compression on the remaining pixels, and when the rate controller 110 determines that the remaining bits in the bit budget are less than or equal to the number of bits required to perform a lossy compression on the remaining pixels (LossyBitsReq), the rate controller 110 switches to lossy compression for the remaining pixels. In other implementations, a different threshold number of remaining bits in the bit budget may be set for switching between lossless and lossy compression.

Figure 5B:
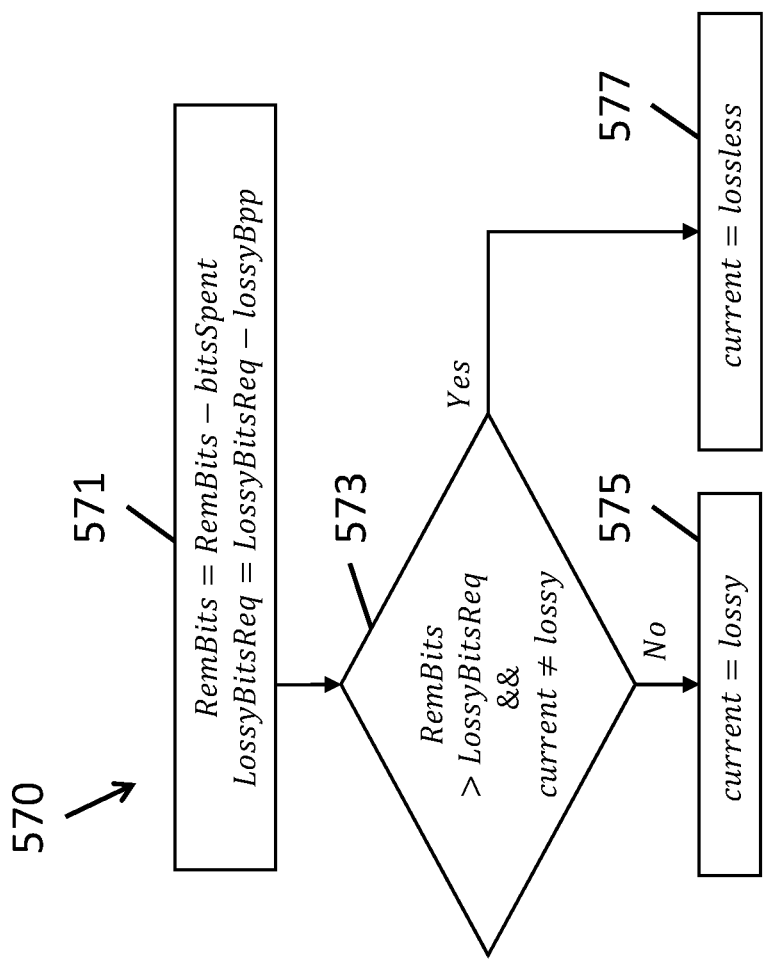
FIG. 5B is a flowchart depicting a method for updating a state of a rate controller according to one embodiment of the present disclosure.

FIG. 5B is a flowchart depicting a method for updating a state of a rate controller according to one embodiment of the present disclosure. In operation 571, each time a value is encoded using the lossless codec 170, the rate controller 110 subtracts the number of bits used in the encoded representation of the value (bitsSpent) from the remaining bit budget (RemBits) for the frame of data 10 (RemBits=RemBits−bitsSpent) and also updates the number of lossy bits required (LossyBitsReq) to encode the remaining values of the frame of data 10 (LossyBitsReq=LossyBitsReq−lossyBpp). In operation 573, the rate controller 110 then determines whether the remaining values (e.g., pixels) in the frame of data 10 are expected to consume less than the remaining bit budget using the lossless codec 170 (RemBits>LossyBitsReq) and whether the current codec is not the lossy codec 180 (current≠lossy). In some embodiments, the determination of whether the current codec is the lossy codec (current≠lossy) is omitted, because, in some embodiments, the rate control is updated only when it is determined, in operation 560, that the current codec is the lossless codec (current=lossless). In response to the rate controller 110 determining that both conditions are met, the rate controller 110 maintains the current codec as the lossless codec 170 in operation 575. Otherwise (e.g., when the remaining bit budget (RemBits) does not exceed the bits required to encode the remaining data of the input frame using the lossy codec), the rate controller 110 sets the current codec to the lossy codec 180 in operation 577 (without allowing return to the lossless codec, such that the remaining pixels 520 are encoded using the lossy codec 180). After updating the rate control in operation 570 (e.g., in operations 575 or 577), the rate controller 110 and proceeds to operation 580, as shown in FIG. 5A.

As noted above, the number of lossy bits required (LossyBitsReq) is based on the product of the number of remaining samples or pixels (RemainingPixels) and the lossy bitrate for each sample or pixel (lossyBpp), e.g., LossyBitsRequired=(RemainingPixels+1)×lossyBpp. However, at the switching point from the lossless codec 170 to the lossy codec 180, it cannot be guaranteed that LossyBitsRequired=(RemainingPixels+1)×lossyBpp, because the current value (or current pixel) is encoded using the lossy codec 180 (not the lossless codec 170) and therefore extra margin bits (ExtraBits) are further included to account for the potential difference in the length of the encoded current pixel using the lossless codec and the encoding of the pixel using the lossy codec. These margin bits may be reserved in a buffer of the memory (e.g., the storage medium 50) or the buffer may be expanded based on the margin bits. To illustrate, the buffer may have a size of TargetBitBudget=targetBPP*$N_{pixels}$. The encoder 100a may be configured to reserve bits in the buffer for the margin bits or may be configured to expand the buffer based on the margin bits. For example, in some embodiments, the extra margin bits are included by initializing, in operation 510, the remaining bit budget (RemBits) to the target bit budget (TargetBitBudget) minus the extra margin bits (RemBits=TargetBitBudget−ExtraBits). Accordingly, the buffer of TargetBitBudget size will have extra margin bits reserved. In some embodiments, the extra margin bits are included by initializing, in operation 510, the remaining bit budget (RemBits) to the target bit budget (TargetBitBudget) and adding the extra bits to the buffer in the memory (e.g., storage medium 50), such that the total size of the buffer in the memory is TargetBitBudget+ExtraBits (e.g., such that the data is compressed to a size less than or equal to TargetBitBudget+ExtraBits). In one embodiment, the extra margin bits are allocated in accordance with ExtraBits=W−lossyBpp−1, where W represents the length of the longest binary codeword of a symbol in the lossless codec 170. (The lengths of the codewords for each symbol can be found from the codebook for the lossless codec 170 that maps each symbol (or residue) to a binary word. An example codebook for a lossless codec is shown in Table 4, below.) In one embodiment, ExtraBits is aligned or rounded up to the nearest 8-bit or 16-bit boundary. For example, the number of margin bits may be rounded up to the nearest multiple of 8-bits or 16-bits (e.g., in accordance with the word size of the architecture of the storage medium), or rounded up in accordance with other physical constraints of the physical medium (e.g., payload size of a data transfer protocol or page size of a memory module).

The below is a pseudocode representation of a method for updating the state of the rate controller 110 and for setting a current codec in accordance with one embodiment of the present disclosure:

```
RemBits = TotalBitBudget
LossyBitsReq = TotalPixels × lossyBpp
for i = 1:TotalPixels {
    RemBits -= BitsSpent
    LossyBitsReq -= lossyBpp
    if RemainingBits > LossyBitsReq
        Continue (near) lossless codec
    else
        Switch to lossy codec
    end
}
```

Implementing the rate controller includes the use of two counters (one for each of RemBits and LossyBitsReq) and one comparator for comparing the values of the two counters. The comparator and counters may be implemented in hardware or software. According to some embodiments of the present disclosure, no line buffer (or buffer for storing some other subunit of the frame) or frame buffer is required. Accordingly, some aspects of embodiments of the present disclosure relate to a hybrid encoder having a low hardware cost, where the rate controller 110 is implemented using only two counters and one comparator.

In the embodiments described in detail above, the rate controller 110 evaluates whether to switch between codecs on a pixel-by-pixel (or sample-by-sample) basis (or pixel level of granularity). However, embodiments of the present disclosure are not limited thereto. For example, when encoding image data, evaluating whether to switch between codecs may be made on a row-by-row (or line-by-line) basis or a block-by-block basis (or block level of granularity, where a block represents a group of adjacent pixels or samples). In these embodiments, the appropriate number of extra margin bits (ExtraBits) is modified based on the size of the sub-units at which the decision to switch codecs is made. For example, in the case of an encoder that makes the codec switching decision on a line-by-line basis (or line level of granularity), ExtraBits=#pixelsInLine×(W−lossyBpp)−1, where W represents the length of the longest binary codeword of a symbol in the lossless codec. (The lengths of the codewords for each symbol can be found from the codebook for the lossless codec 170 that maps each symbol (or residue) to a binary word.) In embodiments where the level of granularity is a block, the number of extra margin bits would be calculated as ExtraBits=#pixelsInBlock×(W−lossyBpp)−1. In both cases, as above, the number of margin bits may be rounded up to the nearest multiple of 8-bits or 16-bits (e.g., in accordance with the word size of the architecture of the storage medium), or rounded up in accordance with other physical constraints of the physical medium (e.g., payload size of a data transfer protocol or page size of a memory module).

In addition, according to some embodiments of the present disclosure, no additional signaling is used in the encoded data 30 to signal the switch between different codecs (e.g., from the lossless codec to the lossy codec). In such embodiments where no additional signaling is used, the decoder 200 further includes a corresponding rate controller 210 that implements substantially the same method described above with respect to FIG. 5B to determine when the encoder 100a would have switched between the different codecs and to automatically switch between a lossless decoder and a lossy decoder according to the determination made by the decoder rate controller 210.

As such, some aspects of embodiments of the present disclosure relate to a hybrid encoder that initially encodes a frame of data using a lossless encoder and then switches to a lossy encoder (without the possibility of returning to the lossless encoder in the encoding of the frame of data).

In the embodiments discussed above, it was assumed that a single lossy codec 180 is used as a fallback for circumstances where the lossless codec 170 would generate encoded data 30 that exceeded the bit budget for the frame of data. However, embodiments of the present disclosure are not limited thereto, and further include embodiments in which multiple lossy codecs having different bitrates may be used. In some circumstances, using multiple lossy codecs smooths the transition boundary between lossless encoding and lossy encoding.

Figure 6:
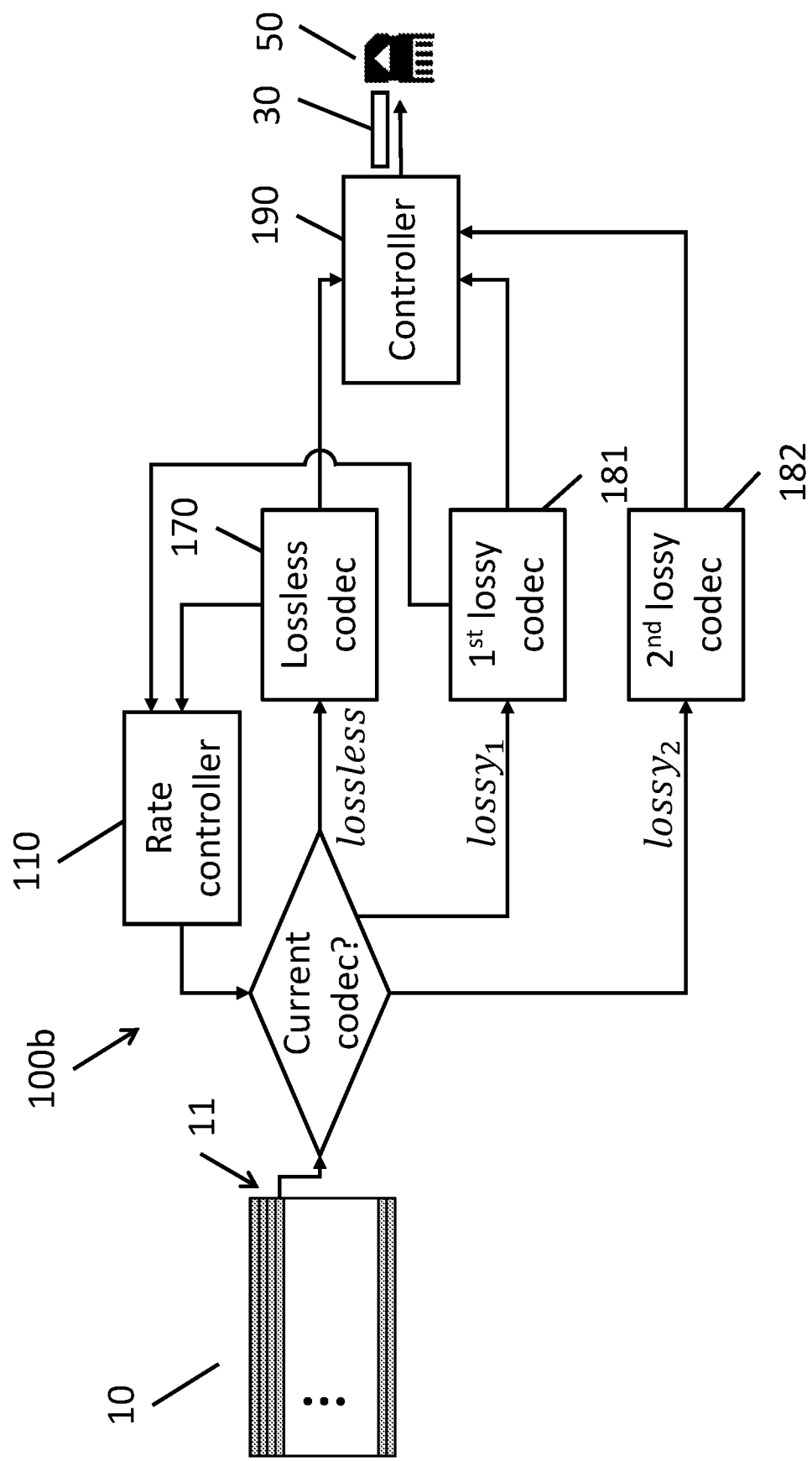
FIG. 6 is a schematic block diagram illustrating an encoder implementing a hybrid data compression codec using multiple lossy codecs according to one embodiment of the present disclosure.
Figure 7A:
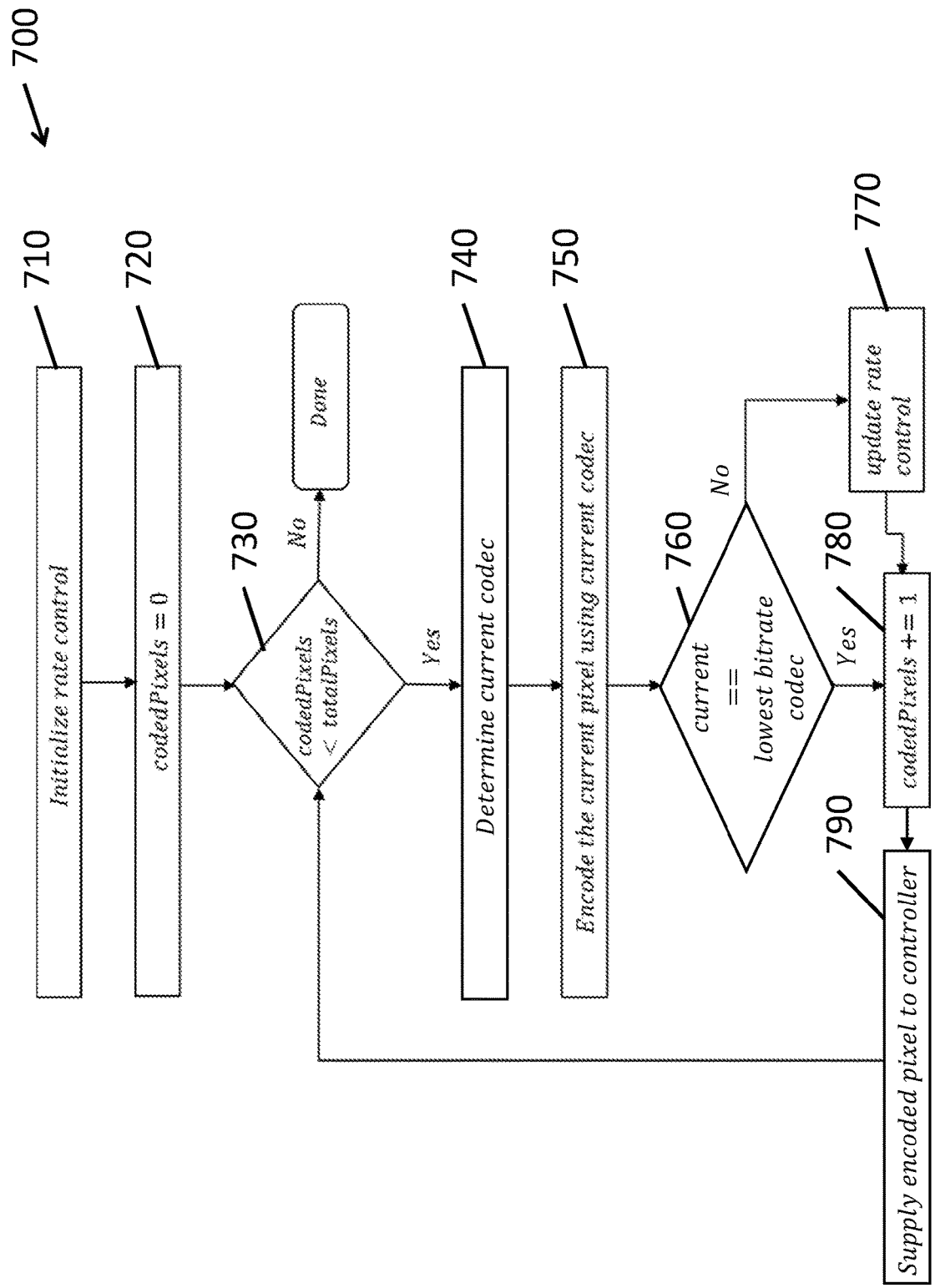
FIG. 7A is a flowchart of a method for encoding image data using hybrid data compression with multiple lossy codecs according to one embodiment of the present disclosure.
Figure 7B:
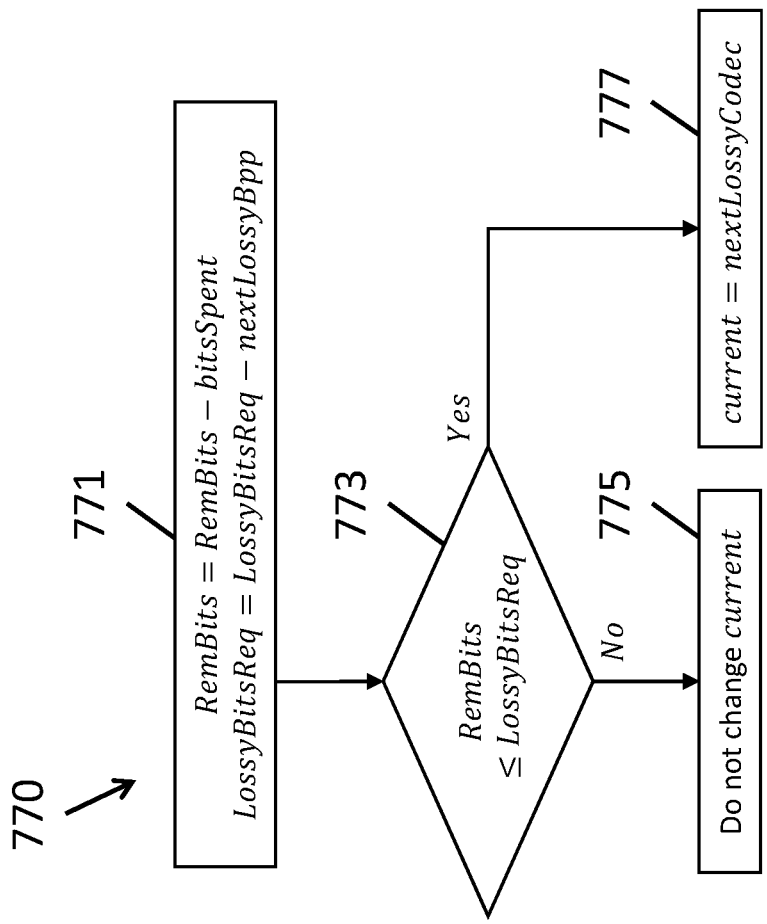
FIG. 7B is a flowchart depicting a method for updating a state of a rate controller of a hybrid data compression codec using multiple lossy codecs according to one embodiment of the present disclosure.

FIGS. 6, 7A, and 7B depict an embodiment in which a lossless codec and two lossy codecs are used in a hybrid data compression codec. However, embodiments of the present disclosure are not limited thereto and may also include embodiments that use more than two lossy codecs (e.g., three or more lossy codecs) in conjunction with the lossless codec.

FIG. 6 is a schematic block diagram illustrating an encoder hybrid data compression using multiple lossy codecs according to one embodiment of the present disclosure. FIG. 6 is similar to FIG. 3, and like reference numerals used in describing FIG. 6 are used to refer to like parts described with respect to FIG. 3. The encoder 100b shown in the embodiment of FIG. 6 is another embodiment of the encoder 100 (e.g., shown in FIG. 1) and includes a rate controller 110, a codec selector 120 that directs input data 10 to a currently selected codec, a lossless codec 170, a first lossy codec 181, and a second lossy codec 182. The first lossless codec is configured to losslessly encode the input data 10, and the first and second lossy codecs 181 and 182 are configured to lossily encode the input data 10 at different bitrates. The encoder 100b further includes a controller 190 configured to receive the encoded data from a codec (e.g., the lossless codec 170, the first lossy codec 181, or the second lossy codec 182) and transmit the data for use by an application, such as for storage on a storage medium 50.

In a manner similar to that described above, the first lossy codec 181 has a bitrate (lossyBpp$_1$) that is lower than the bitrate (losslessBpp or targetBpp) of the lossless codec 170 (lossyBpp$_1$<losslessBpp). Likewise, the second lossy codec 182 has a bitrate (lossyBpp$_2$) that is lower than the bitrate of the first lossy codec 181, such that lossyBpp$_2$<lossyBpp$_1$<targetBpp, so that the magnitude of the error (e.g., loss of accuracy in the reconstructed or decompressed data) increases with progression through the various lossy encoders. Each decision to switch between the codecs shown in FIG. 6, such as from the lossless codec 170 to the first lossy codec 181, or from the first lossy codec 181 to the second lossy codec 182 may be made in a similar manner to that described above with respect to FIGS. 5A and 5B with respect to switching from the lossless codec 170 to the lossy codec 180.

FIG. 7A is a flowchart of a method 700 for encoding image data using hybrid data compression with multiple lossy codecs according to one embodiment of the present disclosure that may be performed by the encoder 100b depicted in FIG. 6. FIG. 7B is a flowchart depicting a method for updating a state of a rate controller of a hybrid data compression codec using multiple lossy codecs according to one embodiment of the present disclosure. FIGS. 7A and 7B are similar to FIGS. 5A and 5B, respectively, and like reference numerals used in describing FIGS. 7A and 7B are used to refer to like operations described with respect to FIGS. 5A and 5B. Accordingly, the description of various similar parts and/or operations will not be repeated in detail herein.

In more detail, and referring to FIG. 7A, before starting to compress a new frame of data 10, in operation 710, the rate controller 110 of the encoder 100b initializes a current codec setting to identify a lossless codec 170, initializes a remaining bit budget (RemBits) value to a target bit budget for the frame, and initializes a lossy bits required (LossyBitsReq) value to the product of the total number of pixels (or samples) in the input frame of data and the bitrate (lossyBpp$_1$) of a first lossy codec 181. In operation 720, the rate controller 110 also initializes a number of coded pixels (codedPixels) (e.g., number of coded symbols of the frame of data) to zero. As the pixel samples (e.g., symbols or values) are received by the encoder 100b (e.g., for image data, by row from top to bottom and from left to right within each row) the encoder 100b determines, in operation 730, if it has finished encoding the current frame of data 10, in a manner similar to that described above with respect to operation 530 of FIG. 5.

In operation 740, the encoder 100b determines which codec is set as the current codec (e.g., the lossless codec 170, the first lossy codec 181, or the second lossy codec 182). In operation 750, the encoder applies the lossless codec 170, the first lossy codec 181, or the second lossy codec 182 based on the codec identified by the current codec state. In operation 760, the encoder 100b determines whether the current codec is the lowest bitrate codec (e.g., the second lossy codec 182 in the particular example described with respect to FIG. 6). If the current codec is not the lowest bitrate codec, then in operation 770, the encoder 100b updates the rate controller 110 to determine whether to change the current codec, as described in more detail below with respect to FIG. 7B.

In operation 780, the number of coded pixels is incremented to identify that one more pixel has been encoded (codedPixels+=1), and in operation 790, the encoded data 30, as encoded by either the lossless codec or the lossy codec (as selected in accordance with the current codec, as set by the rate controller 110), is supplied to a controller 190 (e.g., as shown in FIG. 6). The controller 190 may store the data in a storage medium 50 or transmit the data internally (e.g., store the data in a location in memory associated with the controller). The encoder then returns to operation 730 to determine if there are more pixels to encode and to continue encoding or to finish the encoding of the current frame.

As shown in FIG. 7B, updating the rate controller 110 to determine whether to change from the current codec (e.g., the lossless codec 170 or the first lossy codec 181) to the next lower bitrate codec (e.g., the first lossy codec 181 or the second lossy codec 182, respectively) is performed in a substantially similar manner to the decision to switch from the lossless codec 170 to the lossy codec 180 as described above with respect to FIG. 5B. In operation 771, the remaining bit budget (RemBits) is updated to account for the bits spent in encoding the current pixels (RemBits=RemBits−bitsSpent), and the remaining bits required (LossyBitsReq) for the next lower bitrate codec is updated based on the corresponding lossy bitrate (nextLossyBpp).

When the current codec is the lossless codec 170 (lossless), then the next lossy codec (nextLossyCodec) is the first lossy codec 181 (lossy$_1$), and therefore nextLossyBpp=lossyBpp$_1$. Likewise, when the current codec is the first lossy codec 181 (lossy$_1$), then the next lossy codec (nextLossyCodec) is the second lossy codec 182 (lossy$_2$), and therefore nextLossyBpp=lossyBpp$_2$. In embodiments with more than two lossy codecs, the nextLossyCodec is, similarly, the next lossy codec that has a lower bitrate than the bitrate of the current codec (e.g., the codec having a bitrate that is lower than, and closest to, the bitrate of the current codec). The lowest bitrate codec (e.g., the codec among the plurality of lossy codecs of the hybrid encoder 100b having the lowest bitrate) does not have a corresponding nextLossyCodec.

In operation 773, the rate controller 110 determines if the number of remaining bits (RemBits) in the bit budget is less than or equal to the lossy bits required (LossyBitsReq) (e.g., determines whether RemBits<LossyBitsReq). If not, then the current codec (current) is maintained in its current state (represented in FIG. 7B as operation 775, although, in some embodiments, no action is taken by the rate controller 110 to maintain the state of the current codec). If the remaining bit budget (RemBits) is less than or equal to the lossy bits required (LossyBitsReq), then the current codec (current) is set to the next lossy codec (nextLossyCodec) in operation 777, that is, to the codec having the next lower bitrate.

In response to setting the current codec (current) to the lossy codec having the next lower bitrate, the lossy bits required (LossyBitsReq) may be recomputed by the rate controller 110 based on the bitrate of the next lossy codec. For example, while encoding using the lossless codec 170, the lossy bits required (LossyBitsReq) may be computed using the bitrate lossyBpp$_1$ of the first lossy codec 181 (lossyBitsReq=(RemPixels+1)*lossyBpp$_1$). In response to the rate controller 110 determining to switch the current codec to the first lossy codec 181, in some embodiments, the lossy bits required (LossyBitsReq) is recomputed based on the new next lossy bitrate (e.g., lossyBpp$_2$) in accordance with ((totalPixels−codedPixels)*lossyBpp$_2$) or, equivalently lossyBitsReq=(RemPixels+1)*lossyBpp$_2$, and subsequent computations of the lossy bits required (LossyBitsReq) are computed using the bitrate lossyBpp$_2$ of the second lossy codec 182 (e.g., LossyBitsReq=(RemPixels+1)*lossyBpp$_2$.).

To ensure that there are enough bits reserved for the remaining pixels, the encoder 100b further reserves enough extra margin bits to perform the lossy compression using the plurality of fallback codecs. These margin bits may be reserved in a buffer of the memory (e.g., the storage medium 50) or the buffer may be expanded based on the margin bits. To illustrate, the buffer may have a size of TargetBitBudget=targetBPP*N$_{pixels}$, where is a number of pixels in the image content 10. The encoder 100b may be configured to reserve bits in the buffer for the margin bits or may be configured to expand the buffer based on the margin bits. For example, in some embodiments, the extra margin bits are included by initializing the remaining bit budget (RemBits) to the target bit budget (TargetBitBudget) minus the extra margin bits (RemBits=TargetBitBudget−ExtraBits). Accordingly, the buffer of TargetBitBudget size will have extra margin bits reserved. In some embodiments, the extra margin bits are included by initializing, in operation 510, the remaining bit budget (RemBits) to the target bit budget (TargetBitBudget) and adding the extra bits to the buffer in the memory (e.g., storage medium 50), such that the total size of the buffer in the memory is TargetBitBudget+ExtraBits. In the embodiment described above including a first lossy codec 181 (lossy$_1$) and a second lossy codec 182 (lossy$_2$), extra margin bits are allocated for each possible transition between codecs (e.g., from the lossless codec 170 to first lossy codec 181 and from the first lossy codec 181 to the second lossy codec 182), e.g., ExtraBits=ExtraBits$_1$+ExtraBits$_2$. In this embodiment, the extra margin bits ExtraBits$_1$ allocated for transitioning from the lossless codec 170 to the first lossy codec 181 is similar to the extra margin bits described above with respect to FIGS. 3, 4, 5A, and 5B, where: ExtraBits$_1$=W-lossyBpp$_1$−1, where W represents the length of the longest binary codeword of a symbol in the lossless codec 170. Likewise, the extra margin bits (ExtrBits$_2$) allocated for the transition from the first lossy codec 181 to the second lossy codec 182 is given by ExtraBits$_2$=W$_1$-lossyBpp$_2$−1, where W$_1$ represents the length of the longest binary codeword of a symbol in the first lossy codec 170. Generalizing, given a transition from a k-th lossy codec to a (k+1)-th lossy codec (where lossyBpp$_k$>lossyBpp$_{k+1}$), according to some embodiments of the present disclosure, the extra margin bits that are allocated for that transition is ExtraBits$_{k+1}$= W$_k$−lossyBpp$_{k+1}$−1.

In some embodiments of the present disclosure, the encoder 100b is configured to switch from a lossless codec to a lossy codec without the possibility of returning to the lossless codec for a given frame. Similarly, in some embodiments of the present disclosure, the encoder 100b is configured to switch from a higher bitrate codec to a lower bitrate codec without the possibility of returning to encoding using a higher bitrate coder later on in the encoding of the frame of data 10 for a given frame. In these embodiments, the encoder 100b is configured to switch back to the lossless codec for a subsequent frame. However, embodiments of the present disclosure are not limited thereto. For example, some embodiments of the present disclosure relate to an encoder that is configured to allow a return to a higher bitrate codec from a lower bitrate codec (e.g., from the first lossy codec 181 to the lossless codec 170) upon reaching one or more positions within the frame of data 10.

Figure 8:
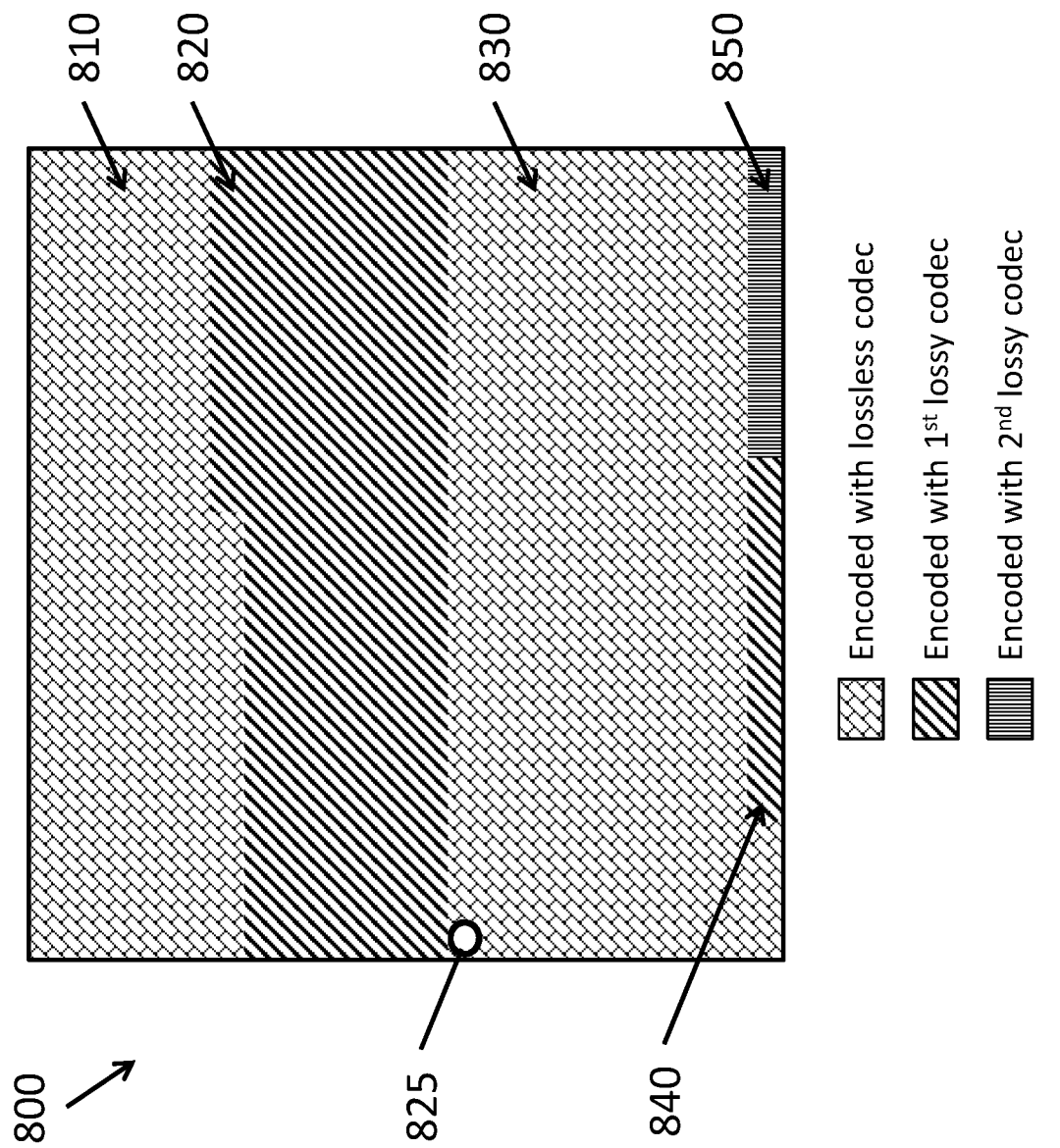
FIG. 8 is a schematic depiction of a process for determining whether to switch between different codecs in accordance with one aspect of embodiments of the present disclosure.

FIG. 8 is a schematic depiction of a process for determining whether to switch between different codecs (e.g., to a higher bitrate codec) in accordance with one aspect of embodiments of the present disclosure. For the sake of convenience, FIG. 8 will be described in the context of the encoder 100b having the lossless codec 170, the first lossy codec 181, and the second lossy codec 182, as shown in the embodiment of FIG. 6 will be described herein.

Figure 9A:
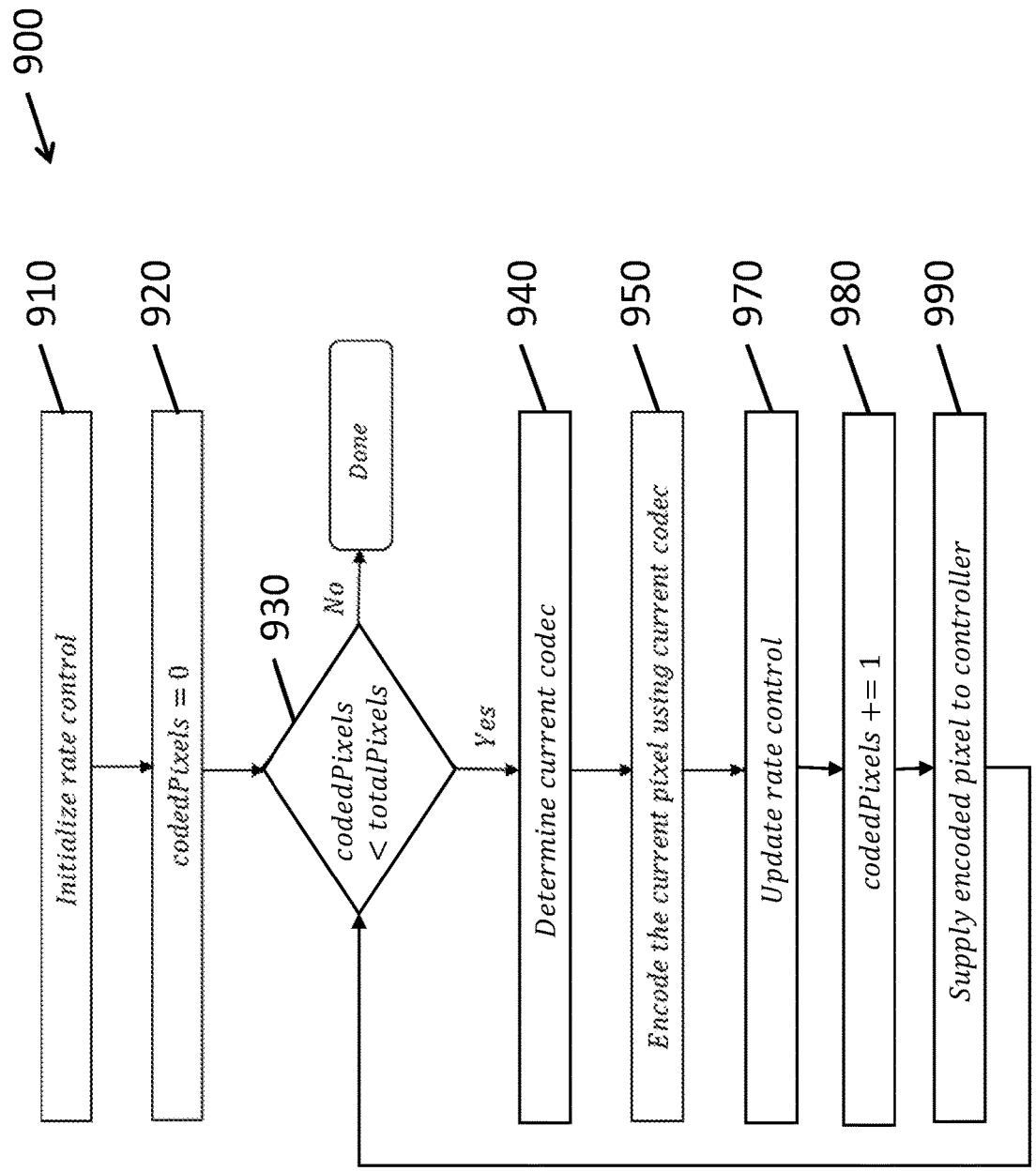
FIG. 9A is a flowchart of a method for encoding image data using hybrid data compression with multiple lossy codecs with return to lossless according to one embodiment of the present disclosure.

FIG. 9A is a flowchart of a method 900 for encoding image data using hybrid data compression with multiple lossy codecs with return to lossless according to one embodiment of the present disclosure. FIG. 9A is substantially similar to FIG. 7A, where like numerals refer to like operations of FIG. 7A, but differs in that FIG. 9A does not include a decision operation (e.g., corresponding to operation 760 of FIG. 7A) based on whether the current codec is the lowest bitrate codec, and instead operation 970 to update the rate control is performed per sub-unit (e.g., per pixel in the embodiment shown in FIG. 9A) of the frame of data.

As shown in FIG. 8, a first portion 810 of a frame of data 800 (e.g., image data) is encoded using the lossless codec 170. While encoding the frame of data, the rate controller 110 may determine that the conditions are met for switching to the first lossy codec 181, such that a second portion 820 of the frame of data 800 is encoded using the first lossy codec 181.

FIG. 9B is a flowchart depicting a method for updating a state of a rate controller of a hybrid data compression codec using multiple lossy codecs with return to lossless in operation 970 according to one embodiment of the present disclosure. Additional operations depicted in FIG. 9B will be described in more detail below.

At one or more particular positions 825, shown in FIG. 8, within the frame of data 800 (e.g., one or more predetermined positions), the rate controller 110 determines whether to switch back to a higher bitrate codec (e.g., the lossy codec 170). Accordingly, as shown in FIG. 9B, after first updating the state of the rate controller 110 in operation 971 based on the bits spent and the bitrate of the next lossy codec (nextLossyBpp), in operation 972, the rate controller 110 determines whether it is currently at a position in the frame of data where return is permitted. If not, then the rate controller proceeds with updating the selection of the current codec (current) in operation 973 in a manner similar to that described above with respect to FIG. 7B. The one or more particular positions may be predetermined positions, such as a beginning of each line, a beginning of each even line, a beginning of each odd line, a beginning of every fourth line, etc.

In operation 974, the rate controller 110 determines whether the current codec is the lossless codec 170 (lossless). If so, then there is no need to consider whether to return to the lossless codec 170, and the rate controller 110 continues with operation 973. If the current codec is a lossy codec, then in operation 976 the rate controller 110 determines whether it should return to a higher bitrate codec (e.g., the lossless codec 170).

According to some embodiments of the present disclosure, the determination of whether to return to the lossless codec is made based on the remaining bit budget (RemBits) and whether the remaining bit budget is expected to be sufficient to encode the remaining portion of the frame of data at the bitrate of the higher bitrate encoder (e.g., when RemBits≥LosslessBitsExpected, where LosslessBitsExpected may be (totalPixels−codedPixels)×targetBpp. (This may occur, for example, when the second portion 820 of the frame of data 800 has low entropy and therefore was encoded using fewer bits than the average bitrate lossyBpp$_1$ of the first lossy codec 181.) If there are sufficient bits for losslessly encoding the remaining portion of the frame of data, then in operation 978 the rate controller 110 sets the current codec to the lossless codec. If not, then the rate controller 110 continues with updating the codec in accordance with operation 973. In the embodiment shown in FIG. 8, at position 825, the rate controller 110 determines that the current codec can return to the lossless codec. As such, after setting the current codec back to the lossless codec, a third portion 830 of the frame of data 800 is encoded with the lossless codec 170. In some embodiments of the present disclosure that include the use of two or more lossy codecs, the rate controller 110 may determine whether the current codec can return to a lossy codec with a higher bitrate, based on whether the remaining bit budget is sufficient to encode the data using the higher bitrate lossy codec, but not sufficient to encode the data using, for example, the lossless codec. For example, in some embodiments, after determining that the current codec cannot return to the lossless codec (e.g., because RemBits<LosslessBitsExpected), the rate controller 110 may determine whether the current codec can return to a higher bitrate lossy codec (e.g., from the second lossy codec 182 to the first lossy codec 181), such as by determining whether RemBits>(totalPixels−codedPixels)* LossyBpp$_1$.

As shown in FIG. 8, later on in the encoding of the frame of data 800, the rate controller 110 determine again that the first lossy codec 181 should be used, and control the encoder to encode a fourth portion 840 of the frame of data 800 using the first lossy codec 181, and further on in the encoding, the rate controller 110 may determine that the second lossy codec 182 should be used to continue encoding, such that a fifth portion 850 of the frame of data 800 is encoded using the second lossy codec 182.

Accordingly, some aspects of embodiments of the present disclosure relate to allowing transitions to a higher bitrate codec at one or more positions within the frame of data.

As noted above, according to some embodiments of the present disclosure, extra margin bits are allocated to the bit budget to accommodate each transition from a higher bitrate codec to a lower bitrate codec. Accordingly, in some embodiments of the present disclosure, the bit budget for encoding a frame of data further includes extra margin bits for each possible transition from a higher bitrate codec to a lower bitrate codec. For example, in the case of the encoder 100b of FIG. 6 having a lossless codec and two lossy codecs and no possibility of return to a higher bitrate codec, there are two possible transitions, and therefore, as noted above, ExtraBits=ExtraBits$_1$+ExtraBits$_2$.

In embodiments that further include the functionality to return to a higher bitrate codec, extra margin bits are further allocated for each possible additional transition. For example, in the embodiment shown in FIG. 8 in the case of the encoder 100b of FIG. 6 having a lossless codec and two lossy codecs, and where there is one position 825 at which a return to the lossless codec 170 is allowed, then there are four possible transitions. The rate controller 110 can transition the encoder 100b from the lossless codec 170 to the first lossy codec 181 and from the first lossy codec 181 to the second lossy codec 182. If both such transitions occur before the position 825 at which the return to the lossless codec 170 is allowed, and the rate controller 110 does actually return the current codec to the lossless codec 170, then two additional transitions are possible (from the lossless codec 170 to the first lossy codec 181 and from the first lossy codec 181 to the second lossy codec 182), and therefore ExtraBits=2×(ExtraBits$_1$+ExtraBits$_2$). If there were multiple positions at which returns to a higher bitrate codec could occur, then additional extra margin bits would be allocated for each additional transition enabled by the additional potential returns.

As noted above, embodiments of the present disclosure are agnostic to the particular lossless codec 170 and lossy codec 180 (or lossy codecs 181 and 182) that are used. According to some embodiments of the present disclosure, differential pulse coded modulation (DPCM) based codecs are used as the lossless and lossy codecs.

According to one example embodiment of using lossless and lossy DPCM codecs, an encoder is configured to encode frames of image data at a bit depth of 3 (e.g., 3 bits per sample or 3 bits per channel (bpc)) such that the input samples can have $2^3$=8 possible values. Because each pixel of an image includes three channels or three components, this suggests an uncompressed bit rate of 9 bits per pixel. (The three components of each pixel correspond to, for example: in the red-green-blue (RGB) color space, these components may include a red component, a green component, and a blue component; in the YCbCr color space, these components may include a luma (Y) component, a chrominance blue (Cb) component, and a chrominance red (Cr) component; and in the YCoCg color space, these components may include a luma (Y) component, a chrominance green (Cg) component, and a chrominance orange (Co) component.)

In this example embodiment, the first lossy codec 181 is designed to have a fixed bitrate of 5 bits per pixel (lossyBpp$_1$=5.0, for a 1.8:1 reduction in bitrate), and the second lossy codec 182 is designed to have a fixed bitrate of 3 bits per sample (lossyBpp$_2$=3.0 for a 3:1 reduction in bitrate).

According to some embodiments of the present disclosure, when using a DPCM-based predictor, the same predictor is used for the lossless and lossy codecs. For a given original sample X(i,j) (from the input frame of image data) at column i and line j of the input frame of image data, a previous reconstructed sample $\hat{X}$(i−1,j) (in the same line or row) is considered as the predictor for the current sample. (The first sample in each line does not contain a predictor. In such cases the predictor is assumed to be zero.) The difference between the original sample X(i,j) (from the input frame of image data) and predictor $\hat{X}$(i−1,j) forms a residue X(i,j)=$\hat{X}$(i,j)−$\hat{X}$(i−1,j).

For 3 bits per channel data, the residue is between [−7, 7] (e.g., the smallest value is 0 and the largest value is 7, and therefore the largest magnitude of the difference is 7, and either the residue or the current value could be the larger value). Accordingly, encoding this residue directly would require one additional bit for the sign value of the residue. According to some embodiments, in order to reduce the cost associated with sign bit signaling, modulo addition is performed instead to encode the residuals using fewer bits:

$R(i,j)=R(i,j)+$qtlen if $R(i,j)<-$offset qtlen=$2^{bitDepth}$+2*offset where offset and qtlen are parameters for shifting the residuals R(i,j) from signed values less than −offset to unsigned values (e.g., only non-negative numbers) using modulo arithmetic. Table 1 shows the offset and qtlen values for the lossless codec and first and second lossy codecs according to this example embodiment:

TABLE 1

|  | Lossless codec | Lossy 1.8:1 | Lossy 3:1 |
| --- | --- | --- | --- |
| offset | 0 | 2 | 3 |
| qtlen | 8 | 12 | 14 |

At the decoder 200, in some embodiments of the present disclosure, modulo subtraction is used to undo the effect of the modulo addition. In modulo subtraction:

$\hat{X}(i,j)=\hat{X}(i,j)-$qtlen if $\hat{X}(i,j)>2^{bitdepth}+$offset−1

For a lossy codec, a reconstructed current sample g(i,j) is computed in accordance with:

$\hat{X}(i,j)=Q^{-1}[Q[R(i,j)]]+\hat{X}(i-1,j)$ where $\hat{X}$(i−1,j) is the predictor (reconstructed previous sample), $Q^{-1}[Q[R(i,j)]]$ is the reconstructed residue, and where Q is a quantization and $Q^{-1}$ is an inverse quantization.

Tables 2 and 3 provide examples of quantization for ranges of residues for the first lossy codec and the second lossy codec, respectively:

TABLE 2

| Quantization - Lossy 1.8:1 | | |
| --- | --- | --- |
| Range of residue | Quantized value (Encoder) | Dequantized value |
| [−2, 1] | 0 | 0 |
| [2, 5] | 1 | 4 |
| [6, 9] | 2 | 7 |

TABLE 3

Quantization - Lossy 3:1

| Range of residue | Quantized value (Encoder) | Dequantized value |
|---|---|---|
| [−3, 3] | 0 | 0 |
| [4, 10] | 1 | 7 |

In the case of a lossless codec, no quantization and inverse quantization is performed, so modulo subtraction is performed in accordance with:

$$\hat{X}(i,j) =_R (i,j) + \hat{X}(i-1,j)$$

Tables 4, 5, and 6 illustrate examples of codebooks mapping quantized values to bit representations thereof for the lossless codec, first lossy codec (lossy 1.8:1), and second lossy codec (lossy 3:1), respectively:

TABLE 4

Codebook - Lossless

| Quantized value | Bit representation |
|---|---|
| 0 | 0 |
| 1 | 101 |
| 2 | 1100 |
| 3 | 1110 |
| 4 | 11110 |
| 5 | 11111 |
| 6 | 1101 |
| 7 | 100 |

TABLE 5

Codebook - Lossy 1.8:1

| Quantized value | Bit representation |
|---|---|
| 0 | 0 |
| 1 | 10 |
| 2 | 11 |

TABLE 6

Codebook - Lossy 3:1

| Quantized value | Bit representation |
|---|---|
| 0 | 0 |
| 1 | 1 |

While aspects of embodiments of the present disclosure are described above in the context of encoding image data having 3 bits per channel and using a lossless codec and two lossy codecs (with bitrates of 5 bits per pixel and 3 bits per pixel, respectively), embodiments of the present disclosure are not limited thereto and may be applied to image data having different bit depths (e.g., 8 bits per channel), different numbers of lossy codecs (e.g., one lossy codec or more than two lossy codecs), and may also be applied to digital data other than image data.

Accordingly, aspects of embodiments of the present disclosure relate to systems and methods for encoding frames of data using a hybrid encoder configured to provide nearly lossless fixed rate compression wherein one or more fallback lossy codecs are applied when a default lossless codec is unable to meet a bit budget.

Although the one or more modules (e.g., encoder 100 and decoder 200) are assumed to be separate functional units, a person of skill in the art will recognize that the functionality of the modules may be combined or integrated into a single module, or further subdivided into further sub-modules without departing from the spirit and scope of the inventive concept.

In some embodiments, the encoder 100 and the decoder 200 (and the rate controller 110 and corresponding rate controller of the decoder 200) discussed above, are implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used"

may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for near lossless fixed-rate hybrid data compression codecs have been specifically described and illustrated herein, many modifications and variations will be apparent to those skilled in the art. Accordingly, it is to be understood that a system and method for near lossless fixed-rate hybrid data compression codecs constructed according to principles of this disclosure may be embodied other than as specifically described herein. The disclosure is also defined in the following claims, and equivalents thereof.

What is claimed is:

1. A method for encoding data comprising:
   receiving a frame of data comprising a plurality of subunits;
   initializing a remaining bit budget to a bit budget for the frame of data;
   setting a current codec to a lossless codec having a lossless codec bitrate; and
   sequentially encoding the subunits of the frame of data, including:
      encoding a first subunit of the subunits using the current codec, set to the lossless codec, to compute a first encoded sub-unit;
      subtracting a length of the first encoded subunit from the remaining bit budget;
      determining whether the remaining bit budget exceeds a first lossy bits required to encode a plurality of remaining subunits of the frame of data using a first lossy codec having a first lossy codec bitrate lower than the lossless codec bitrate;
      in response to determining that the remaining bit budget is less than or equal to the first lossy bits required, setting the current codec to the first lossy codec; and
      encoding a second subunit of the subunits using the current codec, set to the first lossy codec, to compute a second encoded sub-unit.

2. The method of claim 1, wherein the bit budget comprises W-lossyBpp-1 extra margin bits, where W is the length of a longest binary codeword of a symbol in the lossless codec, and where lossyBpp is the first lossy codec bitrate.

3. The method of claim 1, wherein the frame of data is a frame of image data comprising a plurality of pixels.

4. The method of claim 3, wherein the lossless codec is a differential pulse coded modulation (DPCM) codec without quantization, and
   wherein the first lossy codec is a DPCM codec with quantization.

5. The method of claim 3, wherein the bit budget is set based on a size of a buffer in a display panel for storing the frame of image data for an overdrive algorithm.

6. The method of claim 3, wherein each of the subunits is a pixel of the frame of image data.

7. The method of claim 3, wherein each of the subunits is a line of pixels of the frame of image data.

8. The method of claim 3, wherein each of the subunits is a block of pixels of the frame of image data.

9. The method of claim 1, wherein the sequentially encoding the subunits of the frame of data further comprises, in a state where the current codec is set to the first lossy codec:
   determining whether the remaining bit budget exceeds a second lossy bits required to encode the remaining subunits of the frame of data using a second lossy codec having a second lossy codec bitrate lower than the first lossy codec bitrate;
   in response to determining that the remaining bit budget is less than or equal to the second lossy bits required setting the current codec to the second lossy codec; and
   encoding a third subunit of the subunits using the current codec, set to the second lossy codec, to compute a third encoded sub-unit.

10. The method of claim 9, wherein the bit budget further comprises:
    W-lossyBpp$_1$-1 extra margin bits, where W is the length of a longest binary codeword of a symbol in the lossless codec, and where lossyBpp$_1$ is the first lossy codec bitrate, and
    W$_1$-lossyBpp$_2$-1 extra margin bits, where W$_1$ is the length of a longest binary codeword of a symbol in the first lossy codec, and where lossyBpp$_2$ is the second lossy codec bitrate.

11. The method of claim 9, wherein the sequentially encoding the subunits of the frame of data further comprises, in the state where the current codec is set to a codec other than the lossless codec:
    determining whether the remaining bit budget exceeds an expected number of bits to encode the remaining subunits of the frame of data using the lossless codec;
    in response to determining that the remaining bit budget exceeds the expected number of bits to encode the remaining subunits of the frame of data using the lossless codec, setting the current codec to the lossless codec; and
    encoding a fourth subunit of the subunits using the current codec, set to the lossless codec, to compute a fourth encoded sub-unit.

12. An encoder comprising one or more processing circuits configured to:
    receive a frame of data comprising a plurality of subunits;
    initialize a remaining bit budget to a bit budget for the frame of data;
    set a current codec to a lossless codec having a lossless codec bitrate;
    encode a first subunit of the plurality of subunits using the current codec, set to the lossless codec, to compute a first encoded sub-unit;
    subtract a length of the first encoded subunit from the remaining bit budget;

determine whether the remaining bit budget exceeds a first lossy bits required to encode a plurality of remaining subunits of the frame of data using a first lossy codec having a first lossy codec bitrate lower than the lossless codec bitrate;

in response to a determination that the remaining bit budget is less than or equal to first lossy bits required set, the current codec to the first lossy codec; and encode a second subunit of the subunits using the current codec, set to the first lossy codec, to compute a second encoded sub-unit.

13. The encoder of claim 12, wherein the bit budget comprises W-lossyBpp-1 extra margin bits, where W is the length of a longest binary codeword of a symbol in the lossless codec, and where lossyBpp is the first lossy codec bitrate.

14. The encoder of claim 12, wherein the frame of data is a frame of image data comprising a plurality of pixels.

15. The encoder of claim 14, wherein the lossless codec is a differential pulse coded modulation (DPCM) codec without quantization, and
   wherein the first lossy codec is a DPCM codec with quantization.

16. The encoder of claim 14, wherein the bit budget is set based on a size of a buffer in a display panel for storing the frame of image data for an overdrive algorithm.

17. The encoder of claim 14, wherein each of the subunits is a pixel of the frame of image data.

18. The encoder of claim 14, wherein each of the subunits is a line of pixels of the frame of image data.

19. The encoder of claim 14, wherein each of the subunits is a block of pixels of the frame of image data.

20. The encoder of claim 12, wherein the one or more processing circuits are further configured to, in a state where the current codec is set to the first lossy codec:
   determine whether the remaining bit budget exceeds a second lossy bits required to encode the remaining subunits of the frame of data using a second lossy codec having a second lossy codec bitrate lower than the first lossy codec bitrate;
   in response to a determination that the remaining bit budget is less than or equal to the second lossy bits required, set the current codec to the second lossy codec; and
   encode a third subunit of the subunits using the current codec, set to the second lossy codec, to compute a third encoded sub-unit.

21. The encoder of claim 20, wherein the bit budget further comprises:
   W-lossyBpp$_1$-1 extra margin bits, where W is the length of a longest binary codeword of a symbol in the lossless codec, and where lossyBpp$_1$ is the first lossy codec bitrate, and
   W$_1$-lossyBpp$_2$-1 extra margin bits, where W$_1$ is the length of a longest binary codeword of a symbol in the first lossy codec, and where lossyBpp$_2$ is the second lossy codec bitrate.

22. The encoder of claim 20, wherein the one or more processing circuits are further configured to, in the state where the current codec is set to a codec other than the lossless codec:
   determine whether the remaining bit budget exceeds an expected number of bits to encode the remaining subunits of the frame of data using the lossless codec;
   in response to a determination that the remaining bit budget exceeds the expected number of bits to encode the remaining subunits of the frame of data using the lossless codec, set the current codec to the lossless codec; and
   encode a fourth subunit of the subunits using the current codec, set to the lossless codec, to compute a fourth encoded sub-unit.

* * * * *